United States Patent [19]

Hurter

[11] Patent Number: 4,954,563
[45] Date of Patent: Sep. 4, 1990

[54] MONOAZO DYES CONTAINING SULFOINDOLE COUPLING COMPONENTS

[75] Inventor: Rudolf Hurter, Basel, Switzerland

[73] Assignee: Ciba-Geigy Corporation, Ardsley, N.Y.

[21] Appl. No.: 584,176

[22] Filed: Feb. 27, 1984

[30] Foreign Application Priority Data

Mar. 8, 1983 [CH] Switzerland .................. 1246/83

[51] Int. Cl.$^5$ ............... C09B 29/01; C09B 29/40; D06P 1/39; D06P 3/24
[52] U.S. Cl. ................. 534/783; 534/731; 534/782; 534/790; 534/887
[58] Field of Search ............. 260/165; 534/731, 782, 534/783, 790

[56] References Cited

U.S. PATENT DOCUMENTS

| | | | |
|---|---|---|---|
| 978,439 | 12/1910 | Dressel et al. | 260/165 |
| 1,113,622 | 10/1914 | Hauptmann et al. | 260/165 |
| 1,835,393 | 12/1931 | Hentrick et al. | 260/165 |
| 3,255,173 | 6/1966 | Dehnert et al. | 260/153 |
| 3,925,350 | 12/1975 | Wolfrum et al. | 260/165 |
| 3,993,619 | 11/1976 | Kruckenberg et al. | 534/790 X |
| 4,000,123 | 12/1976 | Sommer et al. | 260/165 |
| 4,060,521 | 11/1977 | vor der Bruck et al. | 260/165 |
| 4,248,774 | 2/1981 | Hugl et al. | 260/165 |
| 4,602,084 | 7/1986 | Hurter | 534/641 |

FOREIGN PATENT DOCUMENTS

| | | | |
|---|---|---|---|
| 13609 | 7/1980 | European Pat. Off. | 260/165 |
| 0013609 | 7/1980 | European Pat. Off. | 260/165 |
| 0042357 | 12/1981 | European Pat. Off. | 534/783 |
| 0084320 | 7/1983 | European Pat. Off. | 534/782 |
| 0102325 | 3/1984 | European Pat. Off. | 534/783 |
| 226240 | 9/1910 | Fed. Rep. of Germany | 260/165 |
| 269213 | 1/1914 | Fed. Rep. of Germany | 260/165 |
| 501107 | 7/1930 | Fed. Rep. of Germany | 260/165 |
| 1812812 | 7/1970 | Fed. Rep. of Germany | 260/165 |
| 2715135 | 10/1978 | Fed. Rep. of Germany | 260/165 |
| 3201112 | 7/1983 | Fed. Rep. of Germany | 260/165 |
| 321521 | 1/1903 | France | 260/165 |
| 12465 | 4/1910 | France | 260/165 |
| 670014 | 11/1929 | France | 260/165 |
| 1366250 | 6/1964 | France | 260/165 |
| 7300699 | 7/1973 | Netherlands | 260/165 |
| 284652 | 4/1929 | United Kingdom | 260/165 |
| 1384508 | 2/1975 | United Kingdom | 260/165 |
| 2002018 | 2/1979 | United Kingdom | 260/165 |

Primary Examiner—Floyd D. Higel
Attorney, Agent, or Firm—Wenderoth, Lind & Ponack

[57] ABSTRACT

Monoazo dyes of the formula

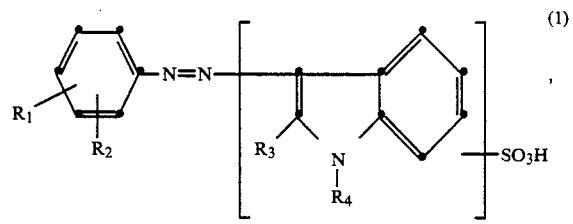

(1)

wherein $R_1$ is hydrogen, $C_1$-$C_4$alkyl, $C_1$-$C_4$alkoxy, halogen, $C_2$-$C_4$alkanoylamino or is an unsubstituted or substituted arylsulfonyl, aryloxy or arylcarbonyl radical; $R_2$ is hydrogen, halogen, an unsubstituted or substituted alkyl, aryloxy or aryloxysulfonyl radical or a radical of the formula

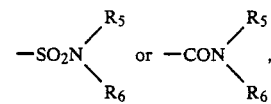

$R_3$ is an unsubstituted or substituted alkyl or aryl radical; $R_4$ is hydrogen or alkyl; and $R_5$ and $R_6$ are each independently hydrogen or an unsubstituted or substituted alkyl, cycloalkyl or aryl radical, with the proviso that $R_1$ may not be hydrogen or halogen if $R_2$ is an unsubstituted or substituted aryloxysulfonyl radical, a radical of the formula

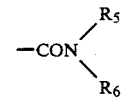

or the trifluoromethyl group, and the sulfo group is attached to the benzene ring of the indole radical, produce dyeings of good light- and wetfastness properties on polyamide material. In particular, the dyeings obtained have shade constancy when subjected to increases in temperature.

11 Claims, No Drawings

MONOAZO DYES CONTAINING SULFOINDOLE COUPLING COMPONENTS

The present invention has for its object to provide novel monoazo dyes which are suitable for dyeing natural and synthetic polyamides from an aqueous bath, which furthermore dye said materials in shades in the range from yellow to orange and, in addition to having good fastness properties such as lightfastness, wetfastness and resistance to formaldehyde, in particular do not give rise to thermochromism. It has now been found that the monoazo dyes of the formula (1) below meet these requirements.

Accordingly, the invention relates to monoazo dyes of the formula

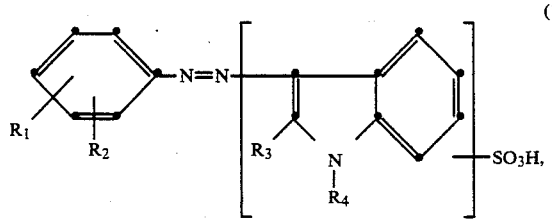

wherein $R_1$ is hydrogen, $C_1$–$C_4$alkyl, $C_1$–$C_4$alkoxy, halogen, $C_2$–$C_4$alkanoylamino or is an unsubstituted or substituted arylsulfonyl, aryloxy or arylcarbonyl radical; $R_2$ is hydrogen, halogen, an unsubstituted or substituted alkyl, aryloxy or aryloxy or aryloxysulfonyl radical or a radical of the formula

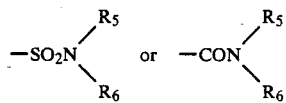

$R_3$ is an unsubstituted or substituted alkyl or aryl radical; $R_4$ is hydrogen or alkyl; and $R_5$ and $R_6$ are each independently hydrogen or an unsubstituted or substituted alkyl, cycloalkyl or aryl radical, with the proviso that $R_1$ may not be hydrogen or halogen if $R_2$ is an unsubstituted or substituted aryloxysulfonyl radical, a radical of the formula

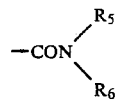

or the trifluoromethyl group, and the sulfo group is attached to the benzene ring of the indole radical.

$R_1$ as $C_1$–$C_4$alkyl is methyl, ethyl, n-propyl, isopropyl, n-butyl, sec-butyl, isobutyl or tert-butyl.

$R_1$ as $C_1$–$C_4$alkoxy is methoxy, ethoxy, n-propoxy, isopropoxy, n-butoxy, sec-butoxy, isobutoxy or tert-butoxy.

$R_1$ as $C_2$–$C_4$alkanoylamino is e.g. acetylamino, propionylamino or butyrylamino.

Where $R_1$ is an unsubstituted or substituted arylsulfonyl, aryloxy or arylcarbonyl radical, the aryl moiety is preferably a radical of the benzene or naphthalene series which may be further substituted, for example by $C_1$–$C_4$alkyl groups such as methyl and ethyl, $C_1$–$C_4$alkoxy groups such as methoxy and ethoxy, halogen such as fluorine, chlorine and bromine, and $C_1$–$C_6$alkanoylamino groups such as acetylamino, and hydroxyl.

$R_1$ and/or $R_2$ as halogen may be fluorine, chlorine or bromine.

Where $R_2$ is an unsubstituted or substituted aryloxy or aryloxysulfonyl radical, the aryl moiety is a radical of the benzene or naphthalene series which may be further substituted, for example by $C_1$–$C_4$alkyl groups such as methyl and ethyl, $C_1$–$C_4$alkoxy groups such as methoxy and ethoxy, halogen such as fluorine, chlorine and bromine, $C_1$–$C_6$alkanoylamino groups such as acetylamino, and hydroxyl.

Unsubstituted or substituted alkyl radicals $R_2$, $R_3$, $R_5$ or $R_6$ are preferably each independently a straight chain or branched $C_1$–$C_{12}$alkyl, preferably $C_1$–$C_4$alkyl, radical which may be further substituted, for example by halogen such as fluorine, chlorine or bromine, hydroxyl, cyano, $C_1$–$C_4$alkoxy such as methoxy or ethoxy, and $C_1$–$C_6$alkanoyl groups such as the acetyl or propionyl group, and the benzoyl group. The alkyl radical $R_3$ can also be substituted by sulfo. Typical examples of alkyl radicals $R_2$, $R_3$, $R_5$ and $R_6$ are: methyl, ethyl, propyl, isopropyl, butyl, sec-butyl, tert-butyl, isobutyl and trifluoromethyl.

Unsubstituted or substituted aryl radicals $R_3$, $R_5$ and $R_6$ are preferably each independently a radical of the benzene or naphthalene series which can be further substituted, for example by $C_1$–$C_4$alkyl groups such as methyl, $C_1$–$C_4$alkoxy groups such as methoxy and ethoxy, halogen such as fluorine, chlorine or bromine, trifluoromethyl, $C_1$–$C_6$alkanoylamino groups such as acetylamino, and hydroxyl and carboxyl. The aryl radical $R_3$ can also be substituted by sulfo. In particular, an aryl radical $R_3$, $R_5$ and $R_6$ is a phenyl radical which can be substituted by methyl, trifluoromethyl and chlorine.

An alkyl radical $R_4$ is preferably a straight chain or branched $C_1$–$C_{12}$alkyl and, most preferably, a $C_1$–$C_8$alkyl radical. Typical examples of such alkyl radicals are: methyl, ethyl, propyl, isopropyl, butyl, sec-butyl, tert-butyl, isobutyl, pent-1-yl, pent-3-yl, hept-1-yl, hept-3-yl and oct-1-yl.

$R_5$ and $R_6$ as unsubstituted or substituted cycloalkyl may each preferably be independently a cycloalkyl group containing 5- to 7-membered rings which may be further substituted, for example by $C_1$–$C_4$alkyl such as methyl. The cyclohexyl group is preferred.

Preferred monoazo dyes of the formula (1) are those wherein $R_1$ is hydrogen, $C_1$–$C_4$alkyl, $C_1$–$C_4$alkoxy, halogen, $C_2$–$C_4$alkanoylamino, a phenylsulfonyl, naphthylsulfonyl, phenoxy or phenylcarbonyl radical, each unsubstituted or substituted by $C_1$–$C_4$alkyl or halogen, $R_2$ is hydrogen, halogen, $C_1$–$C_4$alkyl, tri-fluoromethyl, a phenoxy or phenoxysulfonyl radical, each unsubstituted or substituted by $C_1$–$C_4$-alkyl or halogen, or is

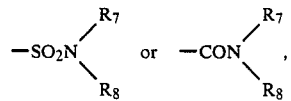

$R_3$ is $C_1$–$C_4$alkyl or phenyl, $R_4$ is hydrogen or $C_1$–$C_8$-alkyl, and $R_7$ and $R_8$ are each independently hydrogen $C_1$–$C_4$alkyl, $C_1$–$C_4$hydroxyalkyl, $C_5$–$C_7$cycloalkyl, phenyl or phenyl which is substituted by halogen, trifluoromethyl or $C_1$–$C_4$-alkyl.

Particularly preferred monoazo dyes are those of the formula

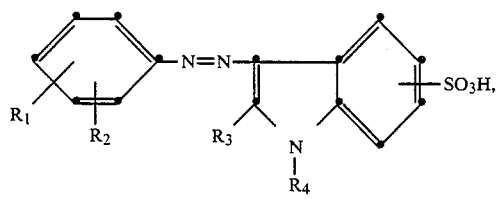

(2)

wherein $R_1$, $R_2$, $R_3$ and $R_4$ are as defined for formula (1).

More particularly preferred monoazo dyes are those of the formula (2), wherein $R_1$ is hydrogen, methyl, chlorine, methoxy, ethoxy, o-methylphenoxy, phenoxy, acetylamino, phenylsulfonyl, p-methylphenylsulfonyl, p-chlorophenylsulfonyl, naphthylsulfonyl, p-methylbenzoyl or p-chlorobenzoyl, $R_2$ is hydrogen, chlorine, methyl, trifluoromethyl, o-methylphenoxy, o-chlorophenoxy, o-chlorophenoxysulfonyl, —$SO_2NH_2$, N—$C_1$–$C_2$alkylaminosulfonyl, N,N-dimethylaminosulfonyl, N-methyl-N-$\beta$-hydroxyethylaminosulfonyl, N-methyl-n-cyclohexylaminosulfonyl, N-phenylaminosulfonyl, N-o-methylphenylaminosulfonyl, N-o-chlorophenylaminosulfonyl, N-m-trifluoromethylphenylaminosulfonyl, N-ethyl-N-phenylaminosulfonyl, —$CONH_2$ or —$CON(CH_3)_2$, $R_3$ is methyl or phenyl, and $R_4$ is hydrogen, methyl, ethyl or octyl.

Further preferred monoazo dyes are those of the formula

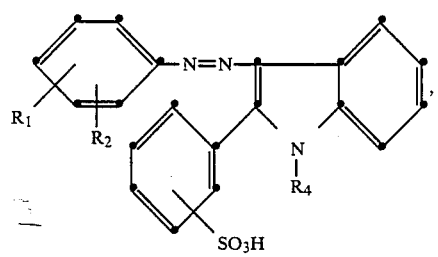

(3)

wherein $R_1$, $R_2$ and $R_4$ are as defined for formula (1), in particular the monoazo dyes of the formula (3), wherein $R_1$ is hydrogen, methyl, chlorine, methoxy, phenoxy, acetylamino, phenylsulfonyl, naphthylsulfonyl, p-methylphenylsulfonyl or p-chlorophenylsulfonyl, $R_2$ is hydrogen, chlorine, trifluoromethyl, —$SO_2NH_2$, N-methyl-N-cyclohexylaminosulfonyl, phenylaminosulfonyl or N-ethyl-N-phenylaminosulfonyl, and $R_4$ is hydrogen or methyl.

Preferred monoazo dyes are also those of the formula

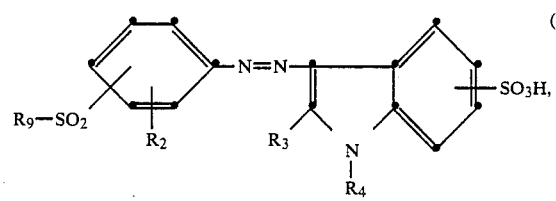

(4)

wherein $R_2$, $R_3$ and $R_4$ are as defined for formula (2) and $R_9$ is a phenyl radical which is unsubstituted or substituted by $C_1$–$C_4$alkyl and halogen, or naphthyl.

In the monoazo dyes of the formula (4), the symbols have the following preferred meanings: $R_2$ is hydrogen, $R_3$ is phenyl, $R_4$ is hydrogen and $R_9$ is phenyl.

A valuable representative is the monoazo dye of the formula

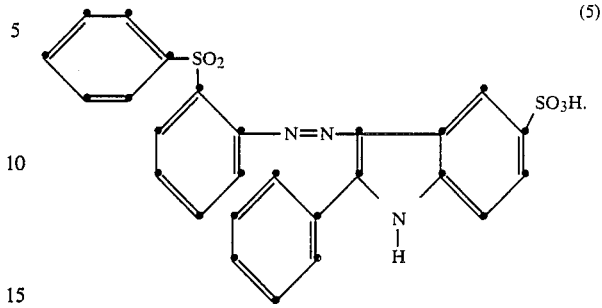

(5)

The present invention also relates to a process for the preparation of the monoazo dyes of the formula (1), which comprises diazotising a diazo component of the formula

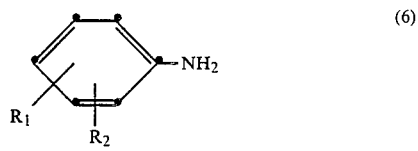

(6)

and coupling the diazonium compound to a coupling component of the formula

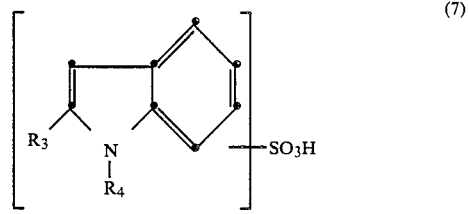

(7)

wherein $R_1$, $R_2$, $R_3$ and $R_4$ in formulae (6) and (7) are as defined for formula (1).

The diazotisation of the diazo component of the formula (6) is normally carried out by treatment with nitrous acid in an aqueous solution of mineral acid at low temperature, and the coupling to the coupling component of the formula (7) is carried out in the acid, neutral or alkaline pH range.

It is preferred to diazotise diazo components of the formula (6), wherein $R_1$ is hydrogen, $C_1$–$C_4$alkyl, $C_1$–$C_4$alkoxy, halogen, $C_2$–$C_4$alkanoyl-amino, a phenylsulfonyl, naphthylsulfonyl, phenoxy or phenylcarbonyl radical, each unsubstituted or substituted by $C_1$–$C_4$alkyl or halogen, $R_2$ is hydrogen, halogen, $C_1$–$C_4$alkyl, trifluoromethyl, a phenoxy or phenoxysulfonyl radical, each unsubstituted or substituted by $C_1$–$C_4$alkyl or halogen, or is

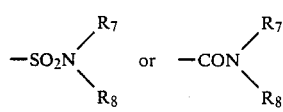

and $R_7$ and $R_8$ are each independently hydrogen, $C_1$–$C_4$alkyl, $C_1$–$C_4$hydroxyalkyl, $C_5$–$C_7$cycloalkyl, phenyl or phenyl which is substituted by halogen, trifluoromethyl or $C_1$–$C_4$alkyl, and to couple the diazonium compound to a coupling component of the formula (7), wherein $R_3$ is $C_1$–$C_4$alkyl or phenyl and $R_4$ is hydrogen or $C_1$–$C_8$alkyl. It is preferred to use a coupling component of the formula

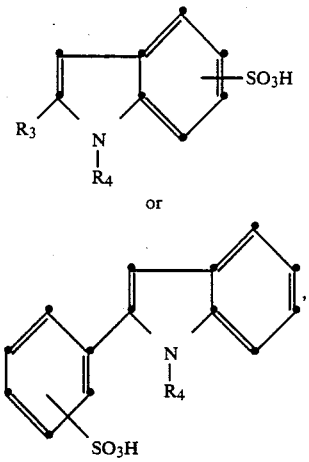

wherein $R_3$ and $R_4$ have the above meanings.

A preferred embodiment of the process comprises diazotising a diazo component of the formula (6), wherein $R_1$ is hydrogen, methyl, chlorine, methoxy, ethoxy, o-methylphenoxy, phenoxy, acetylamino, phenylsulfonyl, p-methylphenylsulfonyl, p-chlorophenylsulfonyl, naphthylsulfonyl, p-methylbenzoyl or p-chlorobenzoyl; $R_2$ is hydrogen, chlorine, methyl, trifluoromethyl, o-methylphenoxy, o-chlorophenoxy, o-chlorophenoxysulfonyl, —$SO_2NH_2$, N—$C_1$-$C_2$alkylaminosulfonyl, N,N-dimethylaminosulfonyl. N-methyl-N-$\beta$-hydroxyethylaminosulfonyl, N-methyl-N-cyclohexylaminosulfonyl, N-phenylaminosulfonyl, N-o-methylphenylaminosulfonyl, N-o-chlorophenylaminosulfonyl, N-m-trifluoromethylphenylaminosulfonyl, N-ethyl-N-phenylaminosulfonyl, —$CONH_2$ or —$CON(CH_3)_2$, and coupling the diazonium compound to a coupling component of the formula (8), wherein $R_3$ is methyl or phenyl and $R_4$ is hydrogen, methyl, ethyl or octyl.

Another preferred embodiment of the process comprises diazotising a diazo component of the formula (6), wherein $R_1$ is hydrogen, methyl, chlorine, methoxy, phenoxy, acetylamino, phenylsulfonyl, naphthylsulfonyl, p-methylphenylsulfonyl or p-chlorophenylsulfonyl, $R_2$ is hydrogen, chlorine, trifluoromethyl, —$SO_2NH_2$, N-methyl-N-cyclohexylaminosulfonyl, phenylaminosulfonyl or N-ethyl-N-phenylaminosulfonyl, and coupling the diazonium compound to a coupling component of the formula (9), wherein $R_4$ is hydrogen or methyl.

Yet another preferred embodiment of the process comprises diazotising a diazo component of the formula (10)

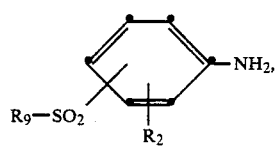

wherein $R_2$ is as defined for formula (2) and $R_9$ is phenyl or phenyl which is substituted by $C_1$–$C_4$alkyl and halogen, or naphthyl, and coupling the diazonium compound to a coupling component of the formula (8).

It is preferred to use a diazo component of the formula (10), wherein $R_2$ is hydrogen and $R_9$ is phenyl, and a coupling component of the formula (8), wherein $R_3$ is phenyl and $R_4$ is hydrogen.

The particularly valuable monazo dye of the formula (5) is prepared by diazotising 2-amino-1,1'-diphenylsulfone and coupling the intermediate to 2-phenylindole-5-sulfonic acid.

The diazo components of the formula (6) are known and are prepared by methods which are known per se.

Representative examples of the wide range of possible diazo components are: 2-amino-1,1'-diphenylsulfone, 2-amino-4-chloro-1-phenyl-2'-naphthylsulfone, 2-amino-4'-methyl-1,1'-diphenylsulfone, 2-amino-4'-chloro-1,1'-diphenylsulfone, 2-amino-1-phenyl-2'-naphthylsulfone, 4-amino-4'-methyl-1,1'-diphenylsulfone, 4-amino-4'-chloro-1,1'-diphenylsulfone, 4-amino-1,1'-diphenylsulfone, 4-amino-1-phenyl-2'-naphthylsulfone, 2-amino-4,4'-dimethyl-1,1'-diphenylsulfone, 2-amino-4-methyl-1,1'-diphenylsulfone, 2-amino-4-methyl-4'-chloro-1,1'-diphenylsulfone, 2-amino-4,4'-dichloro-1,1'-diphenylsulfone, 2-amino-4-chloro-4'-methyl-1,1'-diphenylsulfone, 2-amino-4-trifluoromethyl-1,1'-diphenylsulfone, 2-amino-4-trifluoromethyl-4'-methyl-1,1'-diphenylsulfone, 2-amino-4'-chloro-1,1'-diphenylsulfone-4-sulfamide, 2-amino-1,1'-diphenylsulfone-4-sulfonamide, 2-amino-4'-methyl-1,1'-diphenylsulfone-4-sulfamide, 2-amino-4'-methyl-1,1'-diphenylsulfone-4-N-methylsulfamide, 2-amino-4'-methyl-1,1'-diphenylsulfone-4-N,N-dimethylsulfamide, 2-amino-4'-methyl-1,1'-diphenylsulfone-4-carboxamide, 2-amino-4'-chloro-1,1'-diphenylsulfone-4-carboxamide, 2-amino-4'-methyl-1,1'-diphenylsulfone-4-N,N-dimethylcarboxamide, 2-amino-4'-chloro-1,1'-diphenylsulfone-4-N,N-dimethylcarboxamide, aniline-4-sulfamide, aniline-4-N-methylsulfamide, anilin-4-N-ethylsulfamide, aniline-2-N-methyl-N-$\beta$-hydroxyethylsulfamide, aniline-4-N-methyl-N-$\beta$-hydroxyethylsulfamide, aniline-4-N,N-dimethylsulfamide, aniline-4-N-phenylsulfamide, 2-chloro-5-(4'-methylphenylcarbonyl)aniline, 2-amino-1-phenyl-2'-naphthylsulfone-4-sulfamide, aniline-2-N-ethyl-N-phenylsulfamide, 2-chloro-5(4'-chlorophenylcarbonyl)aniline, anilin-4-N(2'-methylphenyl)sulfamide, anilin-4-N(2'-chlorophenyl)sulfamide, anilin-4-N-(3'-trifluoromethylphenyl)sulfamide, anilin-2-N-methyl-N-cyclohexylsulfamide, 4-methylaniline-3-N-phenylsulfamide, 4-methylaniline-3-N-ethyl-N-phenylsulfamide, 2-trifluoromethyl-4-acetylaminoaniline, 2-chloroaniline, 2-methoxy-5-chloroaniline, aniline, 2-ethoxyaniline, 2-(2'-chlorophenoxy)-5-chloroaniline, anilin-3-N-ethyl-N-phenylsulfamide, 2,4-di(o-methylphenoxy)aniline, 2-phenoxyaniline-5-N-ethyl-N-phenylsulfamide, 2-(2'-methylphenoxy)aniline, 2-methoxyaniline-5-sulfamide, 2-phenoxyaniline, 2-phenoxy-5-chloroaniline, 2,3- or 3,4- or 2,4- or 2,5- or 3,5- or 2,6-dichloroaniline, 2-(2'-chlorophenoxysulfonyl)-5-methylaniline.

Representative examples of the large number of possible coupling components are: 2-phenylindole-5-, -6- or -7-sulfonic acid, 2-methylindole-5-, -6- or -7-sulfonic acid, 1-octyl-2-methylindole-5-sulfonic acid, 1-methyl-2-phenylindole-5-, -6- or -7-sulfonic acid, 1-ethyl-2-methylindole-5-, -6- or -7-sulfonic acid, 1-octyl-2-methylindole-6- or -7-sulfonic acid, 2-p-sulfophenylindole, 2-p-sulfophenyl-1-methylindole, 2-o-sulfophenylindole and 2-o-sulfophenyl-1-methylindole.

The 2-methyl- or 2-phenylindolesulfonic acids employed as coupling components which contain the sulfo group in the benzene ring of the indole are obtained e.g. by reacting phenylhydrazines with ketones by Fischer's indole synthesis (q.v. U.S. Pat. No. 1 866 956), or by sulfonating unsubstituted or substituted indoles in accordance with German patent No. 137 117. In this last mentioned process it is established that the sulfo group is introduced in the 5-position of the indole at least in the case of 2-phenylindole and 2-methyl-N-octylindole.

The 2-sulfophenylindoles used as coupling components which can be substituted in the 1-position by alkyl are obtained e.g. by reacting phenylhydrazines with corresponding ketones by Fischer's indole synthesis (q.v. U.S. Pat. No. 1 866 956).

The dyes of the formula (1) are suitable for dyeing and printing materials which contain amide groups, for example textile fibers, textile filaments and textile fabrics made from wool, silk and polyurethane fibers, and in particular for dyeing and printing synthetic polyamide, using conventional dyeing methods. The dyes of formula (1) are distinguished by brilliance and tinctorial strength, good exhaust properties and build-up, resistance to formaldehyde and by good general fastness properties such as lightfastness, rub-fastness to acid and alkali, wetfastness, in particular fastness to washing, water, hot water and perspiration, and they affor level dyeings.

It is to be singled out for special mention that the dyes of formula (1) combine readily with other acid dyes and are particularly suitable for dyeing or printing by the trichromatic method.

Particular attention is drawn to the fact that the dyes of formula (1) produce dyeings which have very good constancy of shade even when subjected to the increases in temperature occurring e.g. in drying, thermofixing, steaming and ironing.

The dyes of the formula (1) are obtained either in the form of their free sulfonic acid or of salts thereof. Examples of suitable salts are the alkali metal salts, alkaline earth metal salts or ammonium salts, or the salts of an organic amine. Typical examples are the sodium, lithium, potassium or ammonium salts or the salt of triethanolamine.

The invention is illustrated by the following Examples, in which parts are by weight. The relationship between parts by weight and parts by volume is the same as that between the gram and the cubic centimeter.

EXAMPLE 1

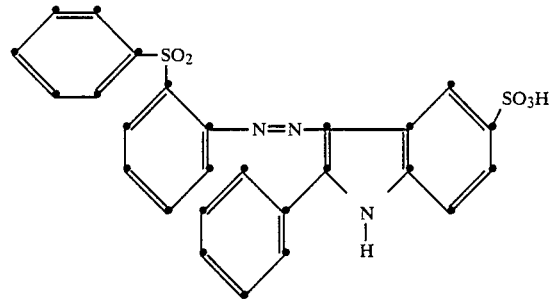

4.66 g of 2-aminodiphenylsulfone are diazotised in 20 ml of 80% acetic acid and 5 ml of concentrated hydrochloric acid at 5° to 7° C. with 5 ml of 4N sodium nitrite. After a time the diazo solution is diluted with 50 ml of ice-water and clarified by filtration.

5.46 g of 2-phenylindole-5-sulfonic acid are stirred in 50 ml of water at room temperature and the above diazo solution is then added dropwise. When the coupling is complete, the dye is isolated by filtration, washed with water and dried in vacuo at 60°–70° C., affording 8.7 g of dye which dissolves very readily in water after addition of 0.9 g of sodium carbonate. Brilliant yellowish orange shades of excellent lightfastness and resistance to formaldehyde and acid are obtained when polyamide material is dyed from a weakly acid bath.

EXAMPLE 2

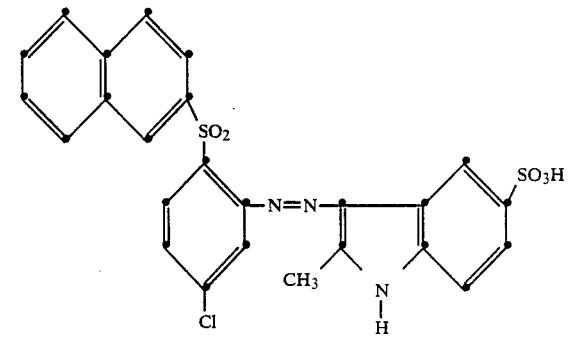

4.76 g of 4-chloro-2-aminophenyl-2-naphthylsulfone are diazotised in 20 ml of sulfolane with 2.5 ml of about 40% nitrosylsulfuric acid. The diazo solution is diluted with 75 ml of water and clarified by filtration.

3.17 g of 2-methylindole-5-sulfonic acid are dissolved in 50 ml of water at room temperature and then the above prepared diazo solution is added dropwise. After a time the dye is isolated by filtration and washed with water. The moist filter cake is dissolved in water with sodium hydroxide solution at pH 7 and the dye is salted out by adding a dilute solution of sodium chloride. The precipitate is isolated by filtration, washed with sodium carbonate and dried in vacuo at 60°–70° C., affording 6.5 g of a dye which dyes polyamide material from a weakly acid bath in brilliant reddish yellow shades of good general fastness properties.

EXAMPLE 3

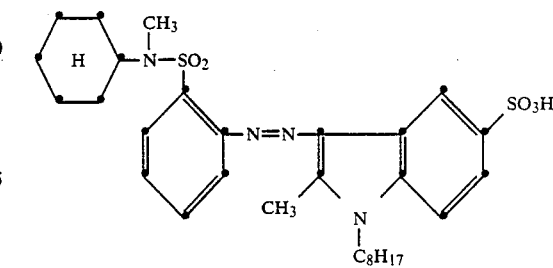

4.02 g of aniline-2-N-methyl-N-cyclohexylsulfamide are diazotised in 20 ml of sulfolane with 2.5 ml of nitrosylsulfuric acid (about 40%) and the diazo solution is then diluted with 40 ml of water. 4.85 g of 2-methyl-N-octylindole-5-sulfonic acid are dissolved in 50 ml of water at room temperature and the above prepared diazo solution is then added dropwise to the solution of the coupling component. Upon completion of the coupling, the completely precipitated product is isolated by filtration and washed with water. The filter residue is suspended in water and the pH is adjusted to 12 with sodium hydroxide solution. The product is isolated by filtration and the filter cake is dried in vacuo at 60°-70° C., affording 5.5 g of a dye which dyes polyamide material in orange shades from a weakly acid bath.

EXAMPLE 4

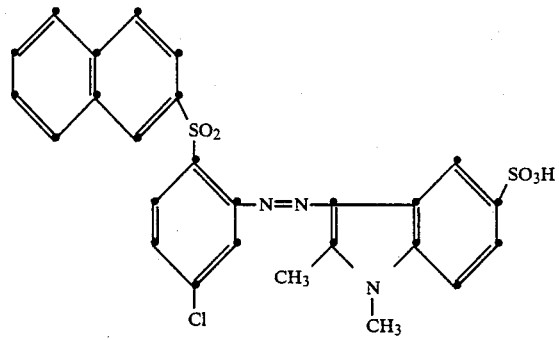

2.7 g of the dye of Example 2, 2.12 g of sodium carbonate and 12 ml of dimethylmethanephosphonate are heated to 120°-130° C. After 3 hours, 60 ml of water and 1.2 g of sodium chloride are added and the mixture is stirred at room temperature. The precipitate is isolated by filtration, washed and dried, affording 1.9 g of alkylated dye.

Following the procedures described in Examples 1 to 4, but using the diazo components and coupling components listed in the following Table, there are also obtained water-soluble dyes which dye polyamide in the indicated shade with good fastness properties.

TABLE

| Example | Diazo component | Coupling component | Shade on polyamide |
|---|---|---|---|
| 1 | | | yellowish orange |
| 2 | ″ | | ″ |
| 3 | | | yellowish orange |
| 4 | | | yellowish orange |

TABLE-continued
| | | | |
|---|---|---|---|
| 5 | 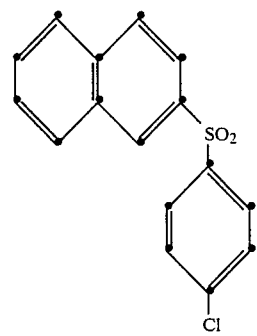 | 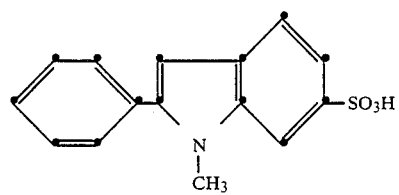 | yellowish orange |
| 6 | 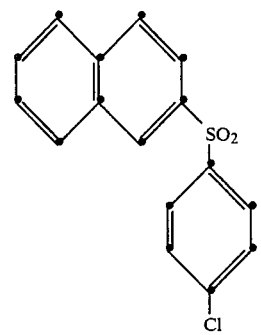 | 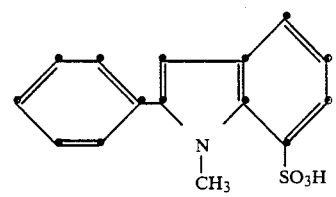 | yellowish orange |
| 7 | 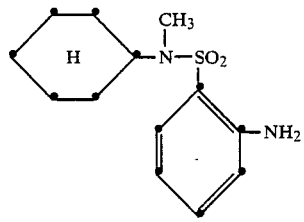 | 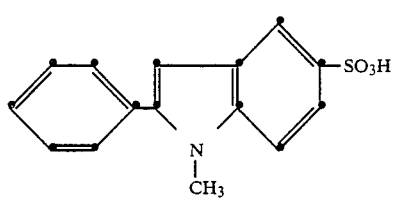 | yellowish orange |
| 8 | 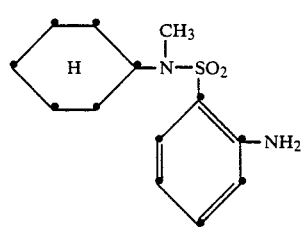 | 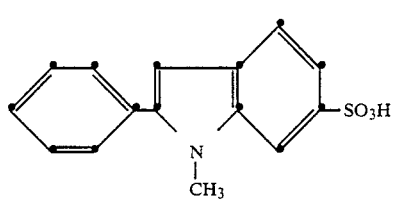 | " |
| 9 | 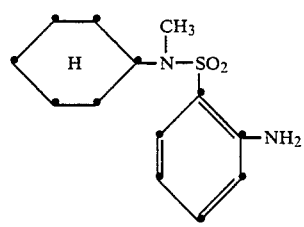 | 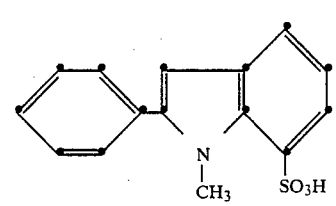 | yellowish orange |
| 10 | 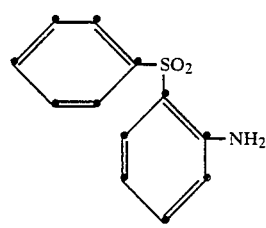 | 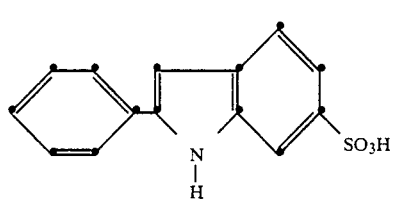 | " |

TABLE-continued
| 11 | 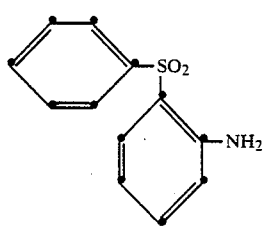 | 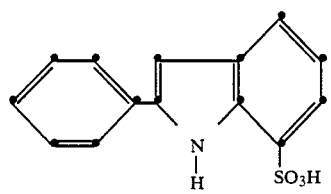 | yellowish orange |
|---|---|---|---|
| 12 | " | 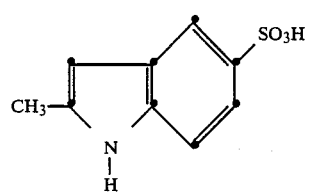 | yellow |
| 13 | 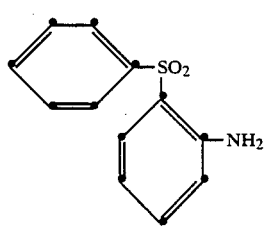 | 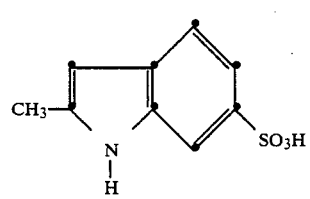 | yellow |
| 14 | " | 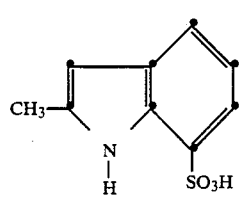 | " |
| 15 | 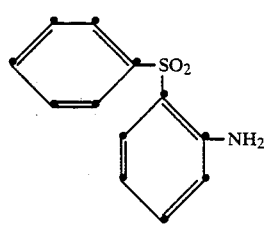 | 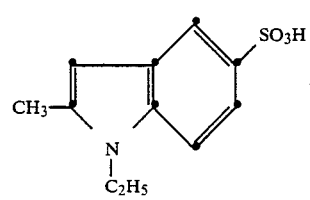 | yellow |
| 16 | " | 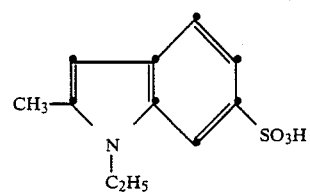 | " |
| 17 | 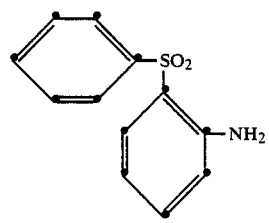 | 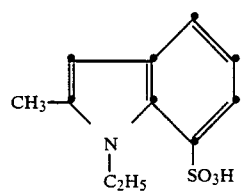 | yellow |

TABLE-continued
| 18 | " | 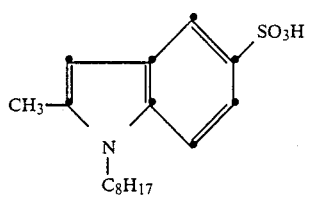 | orange |
| 19 | 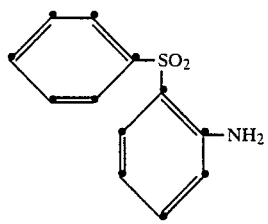 | 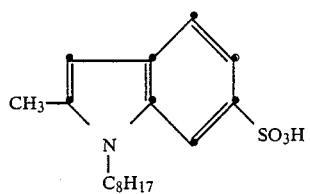 | orange |
| 20 | " | 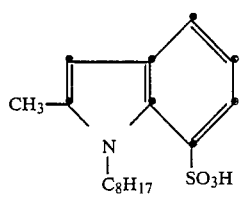 | " |
| 21 | 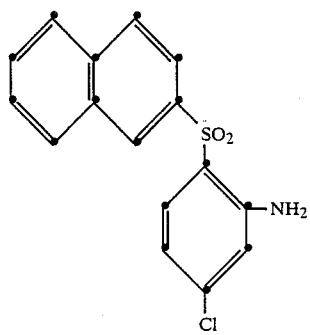 | 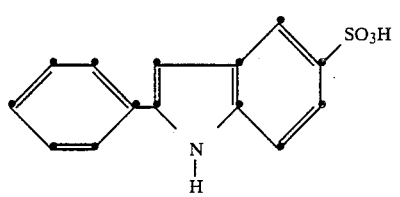 | yellowish orange |
| 22 | " | 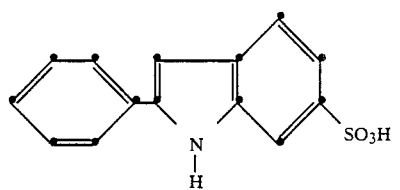 | " |
| 23 | 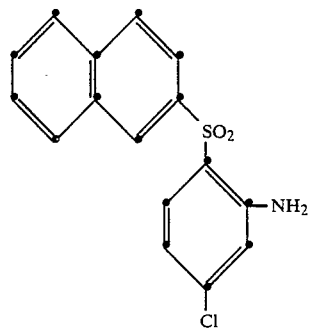 | 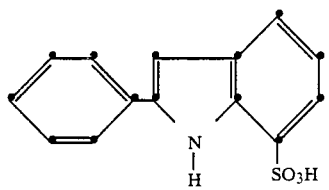 | yellowish orange |

TABLE-continued
| | | | |
|---|---|---|---|
| 24 | " | 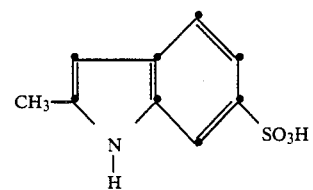 | reddish yellow |
| 25 | 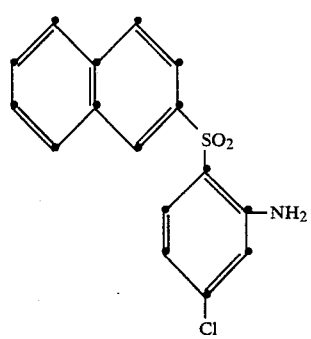 | 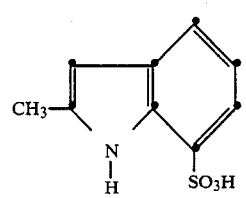 | yellow |
| 26 | " | 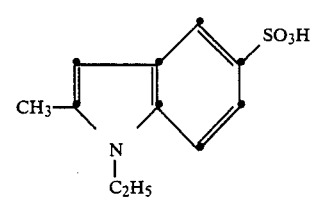 | " |
| 27 | 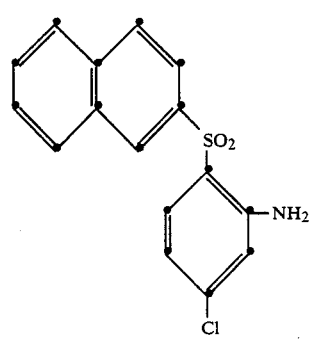 | 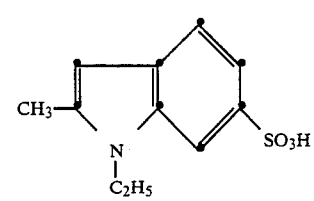 | yellow |
| 28 | " | 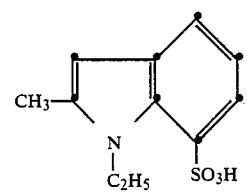 | " |
| 29 | 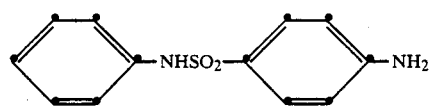 | 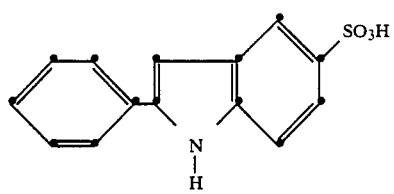 | yellowish orange |
| 30 | 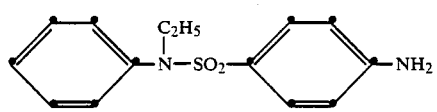 | " | " |

TABLE-continued
| | | | |
|---|---|---|---|
| 31 | 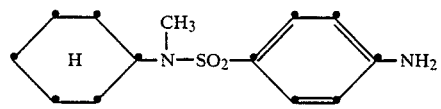 | " | " |
| 32 | 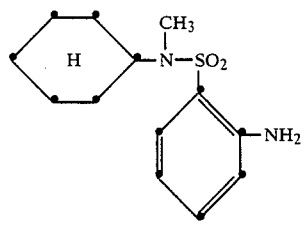 | 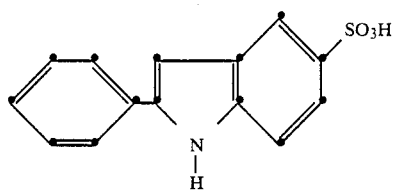 | yellowish orange |
| 33 | " | 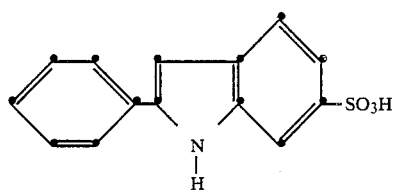 | " |
| 34 | 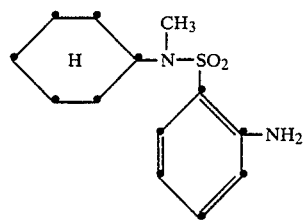 | 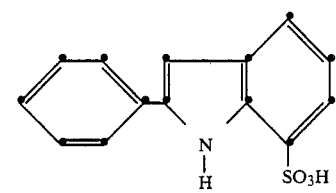 | yellowish orange |
| 35 | " | 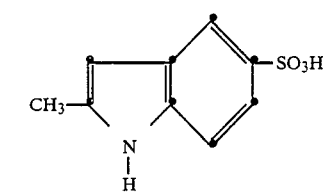 | yellow |
| 36 | 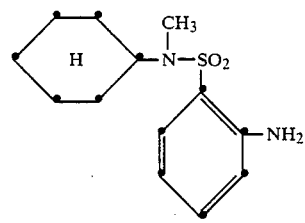 | 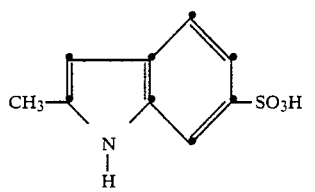 | yellow |
| 37 | " | 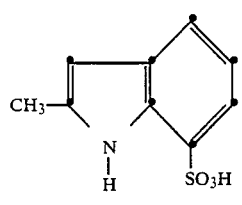 | " |
| 38 | 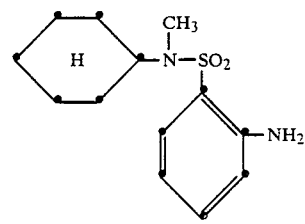 | 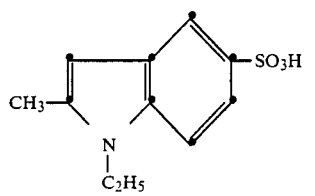 | yellow |

| | | | |
|---|---|---|---|
| 39 | " | 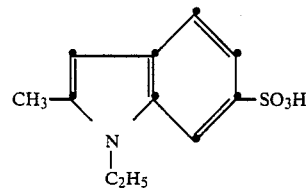 | " |
| 40 | 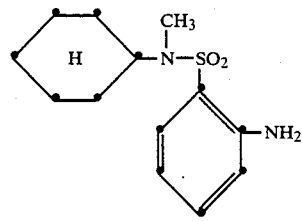 | 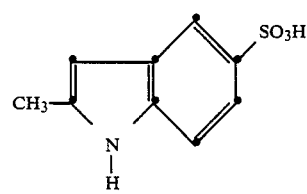 | yellow |
| 41 | 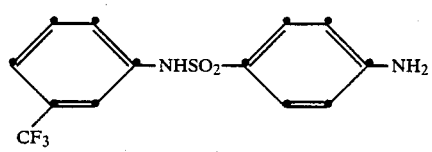 | | " |
| 42 | 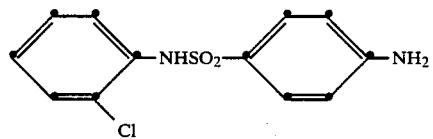 | | yellow |
| 43 | 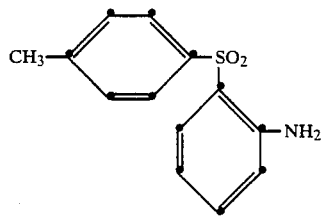 | 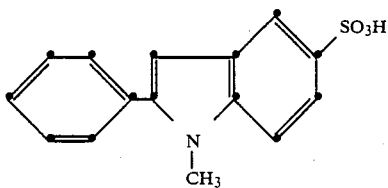 | yellowish orange |
| 44 | 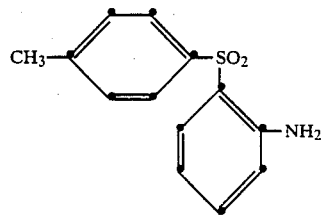 | 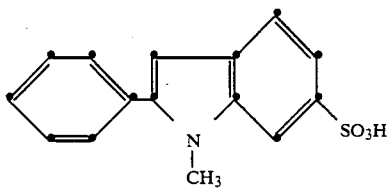 | yellowish orange |
| 45 | " | 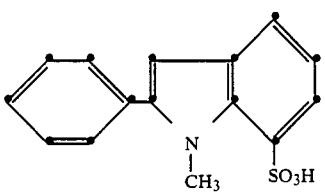 | " |

TABLE-continued
| 46 | 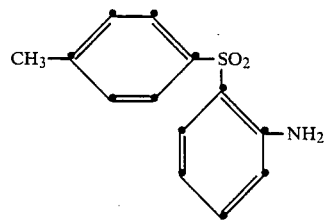 | 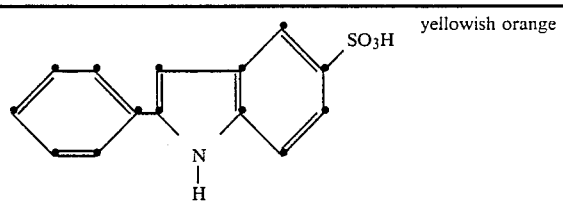 | yellowish orange |
|---|---|---|---|
| 47 | " | 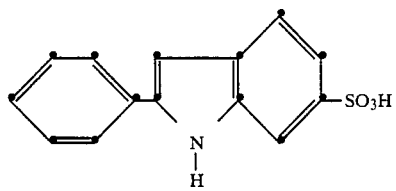 | " |
| 48 | 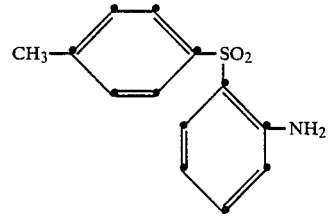 | 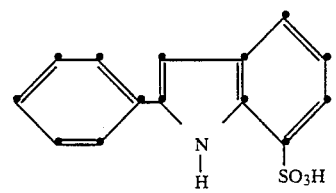 | yellowish orange |
| 49 | " | 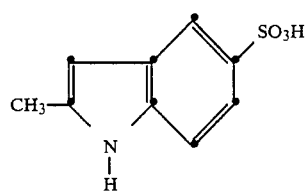 | yellow |
| 50 | 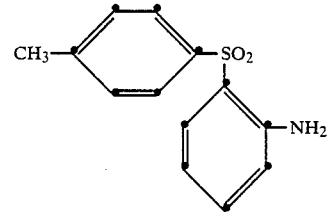 | 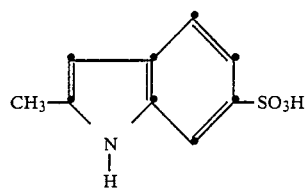 | yellow |
| 51 | " | 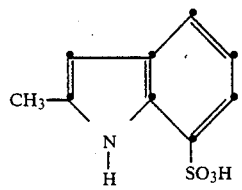 | " |
| 52 | 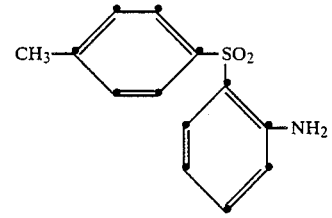 | 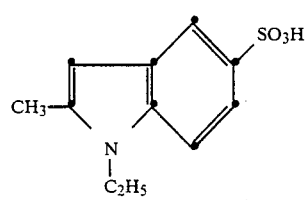 | yellow |

-continued
| | | | |
|---|---|---|---|
| 53 | " | 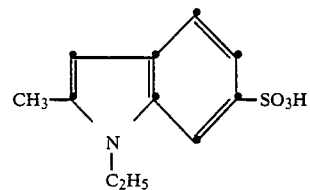 | " |
| 54 | 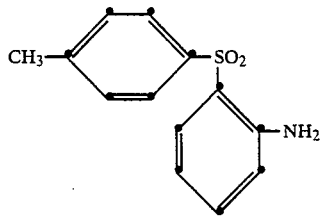 | 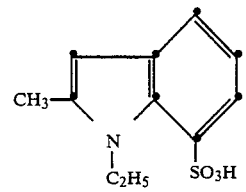 | yellow |
| 55 | 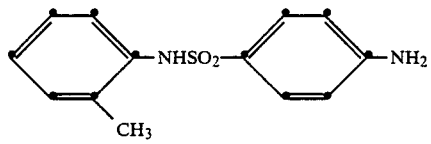 | 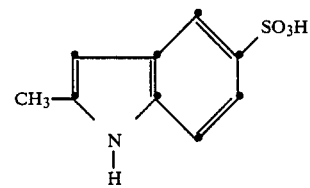 | " |
| 56 | 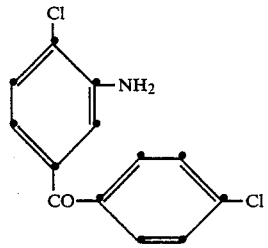 | 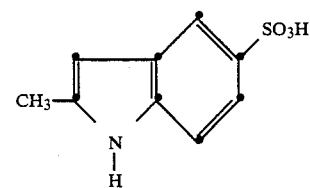 | yellow |
| 57 | " | 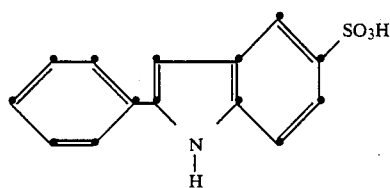 | reddish yellow |
| 58 | 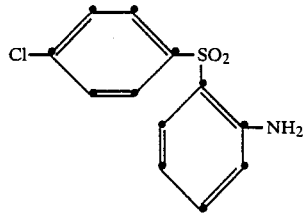 | 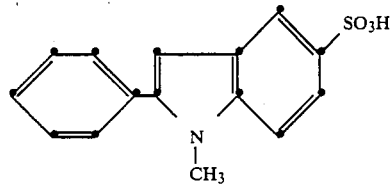 | yellowish orange |
| 59 | " | 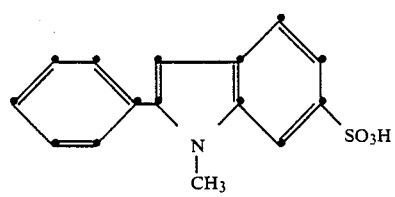 | " |

-continued
| 60 | 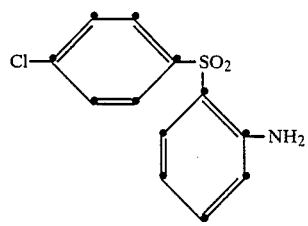 | 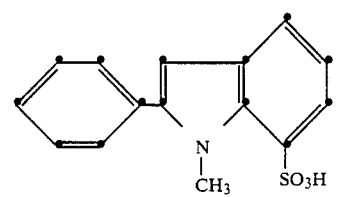 | yellowish orange |
| 61 | " | 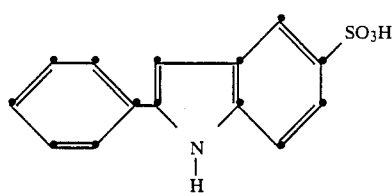 | " |
| 62 | 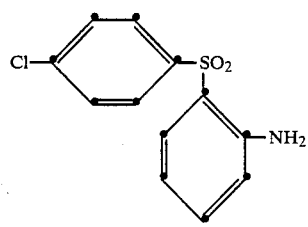 | 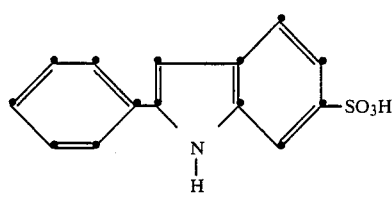 | yellowish orange |
| 63 | " | 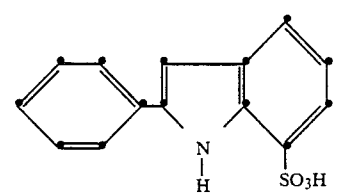 | " |
| 64 | 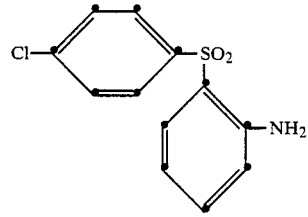 | 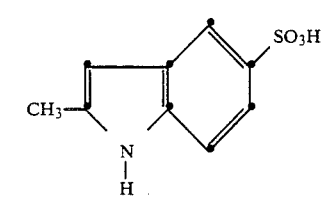 | yellow |
| 65 | " | 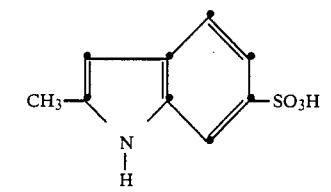 | " |
| 66 | 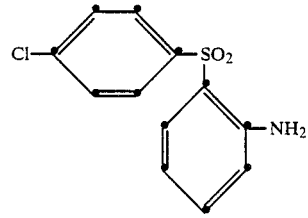 | 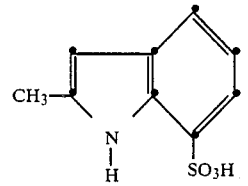 | yellow |

| | | | |
|---|---|---|---|
| 67 | " | 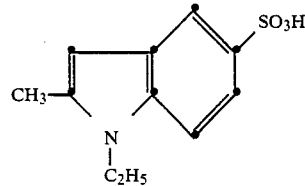 | " |
| 68 | 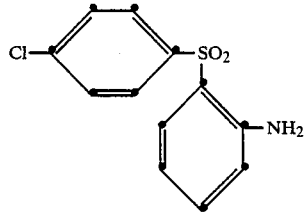 | 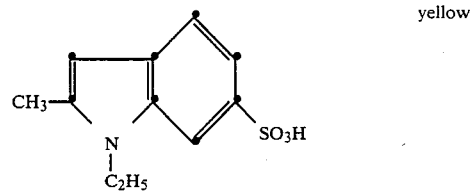 | yellow |
| 69 | " | 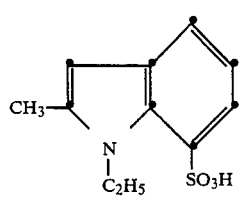 | " |
| 70 | 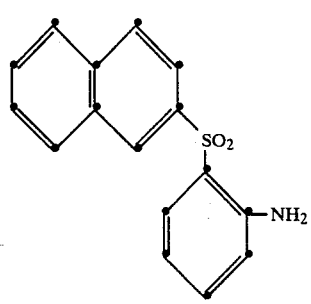 | 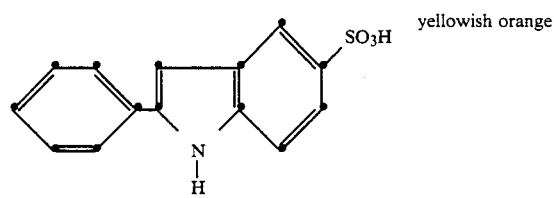 | yellowish orange |
| 71 | " | 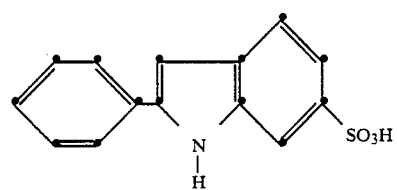 | " |
| 72 | 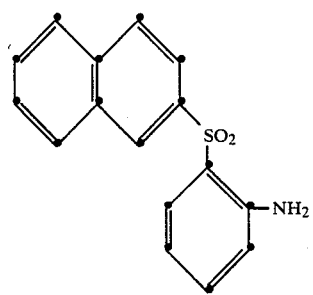 | 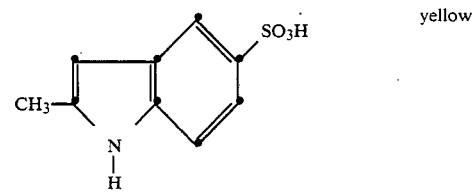 | yellow |
| 73 | " | 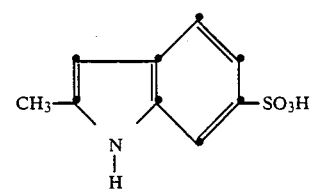 | " |

-continued
74 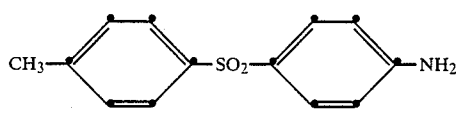 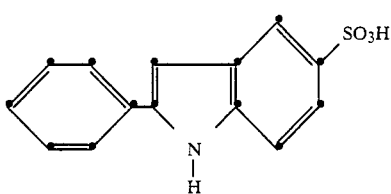 yellowish orange
75 " 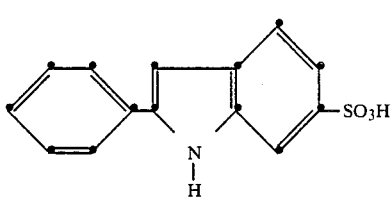 "
76 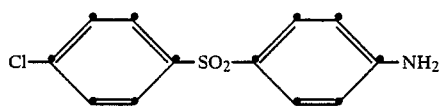 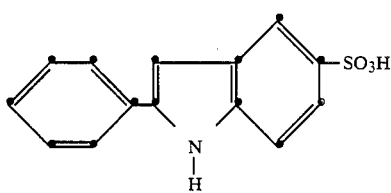 yellowish orange
77 " 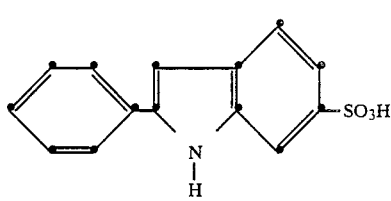 "
78 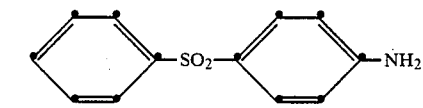 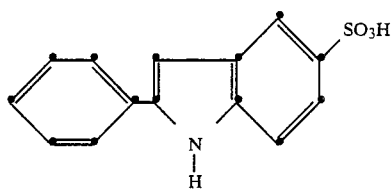 yellowish orange
79 " 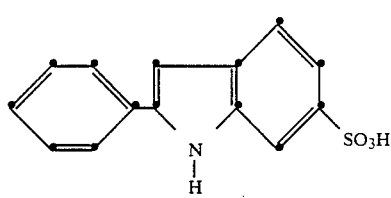 "
80 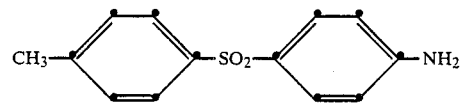 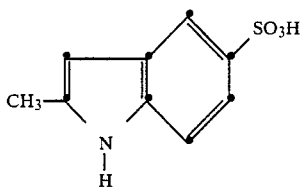 yellow
81 " 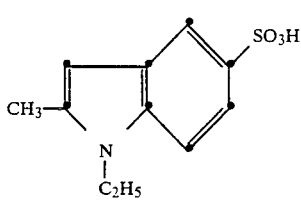 "

-continued
| 82 | 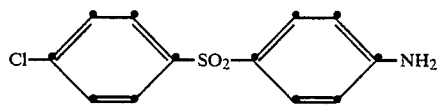 | 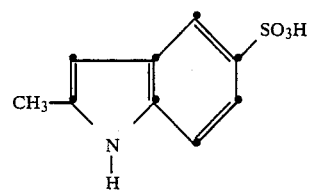 | yellow |
| 83 | " | 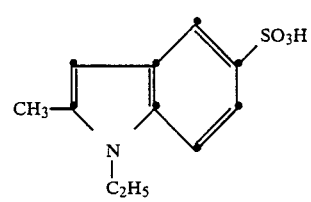 | " |
| 84 | 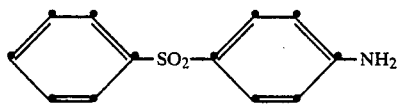 | 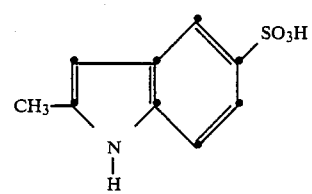 | yellow |
| 85 | " | 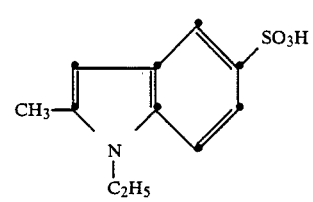 | " |
| 86 | 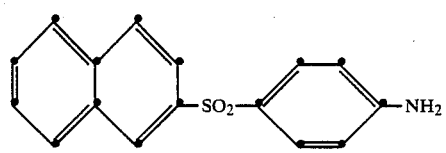 | 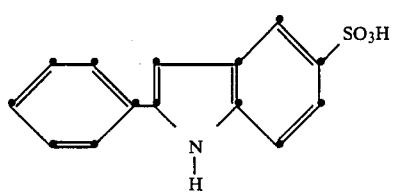 | yellowish orange |
| 87 | " | 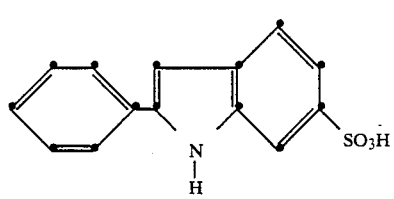 | " |
| 88 | 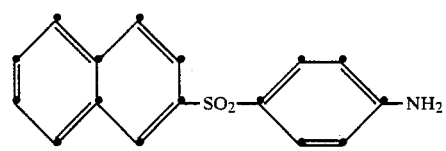 | 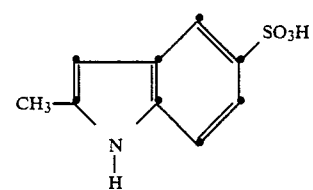 | yellow |
| 89 | " | 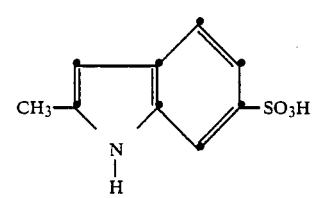 | " |

-continued
| 90 | 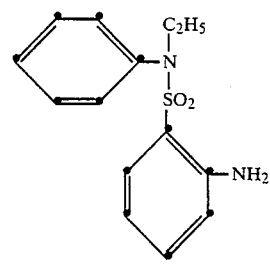 | 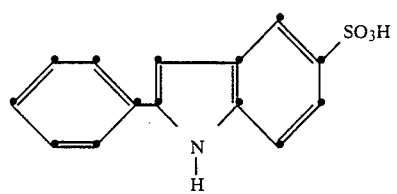 | yellowish orange |
| 91 | " | 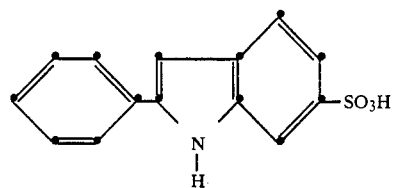 | " |
| 92 | 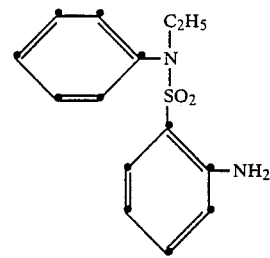 | 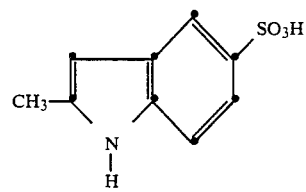 | yellow |
| 93 | " | 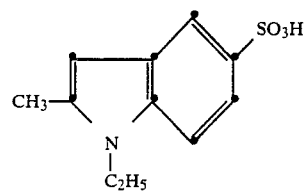 | " |
| 94 | 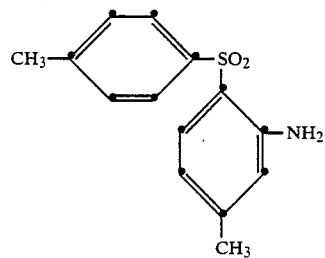 | 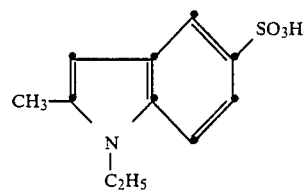 | yellow |
| 95 | " | 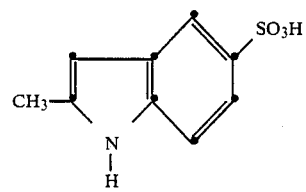 | " |

| | | | |
|---|---|---|---|
| 96 | 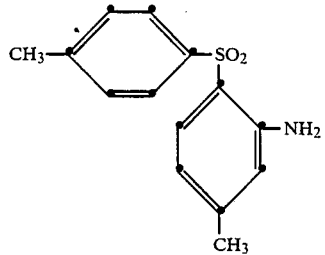 | 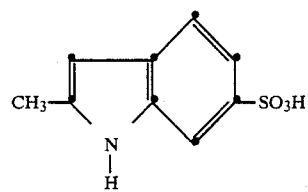 | yellow |
| 97 | " | 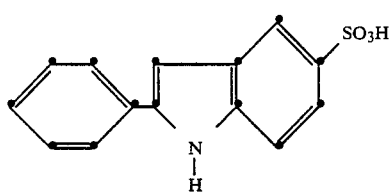 | yellowish orange |
| 98 | 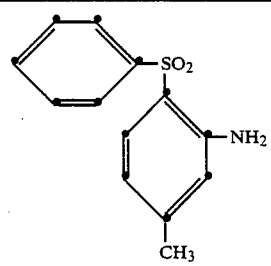 | 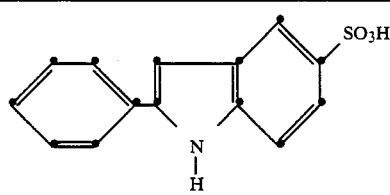 | yellowish orange |
| 99 | 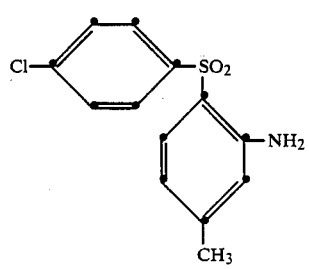 | " | " |
| 100 | 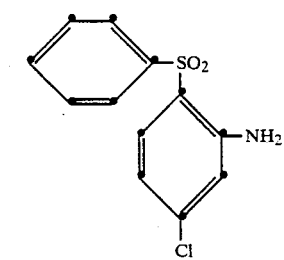 | 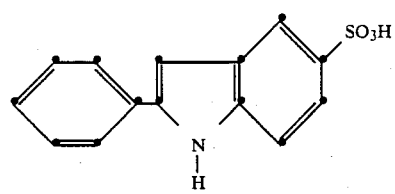 | yellowish orange |
| 101 | 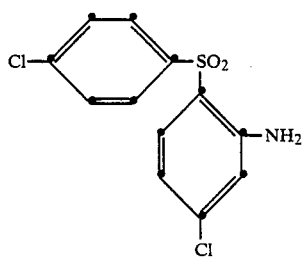 | 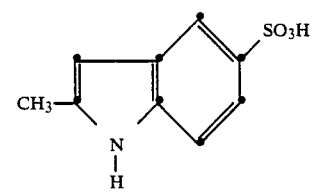 | reddish yellow |

-continued
| | | | |
|---|---|---|---|
| 102 | 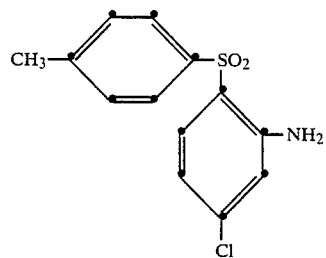 | 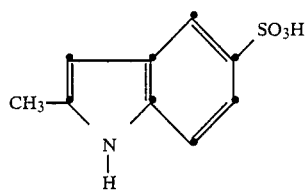 | reddish yellow |
| 103 | 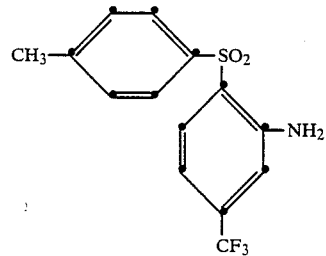 | 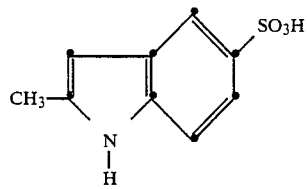 | " |
| 104 | 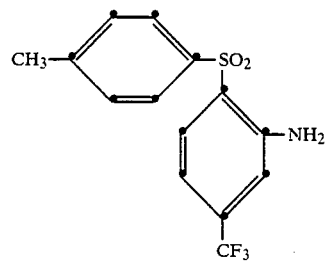 | 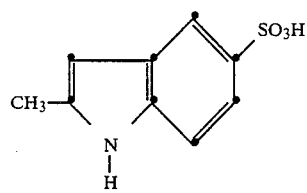 | reddish yellow |
| 105 | " | 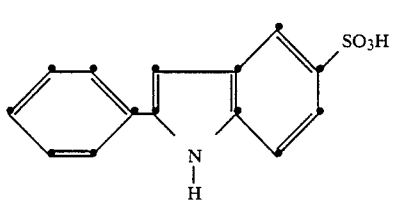 | yellowish orange |
| 106 | 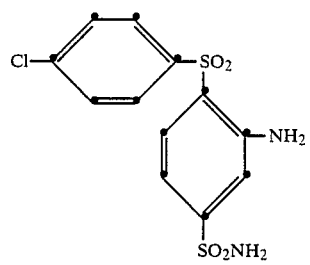 | 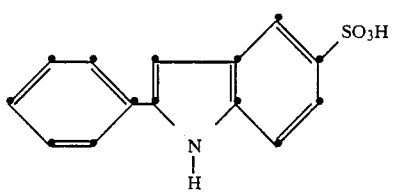 | orange |
| 107 | 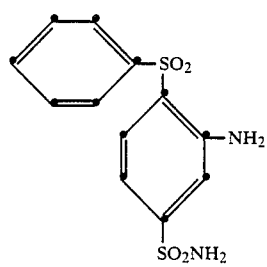 | " | " |

-continued
| | | | |
|---|---|---|---|
| 108 | 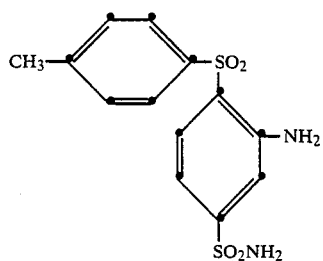 | 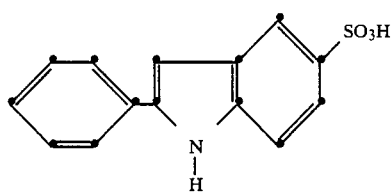 | orange |
| 109 | 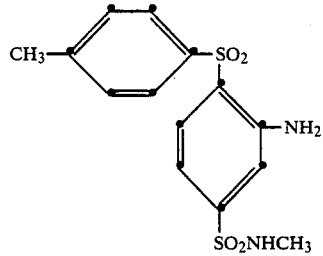 | " | " |
| 110 | 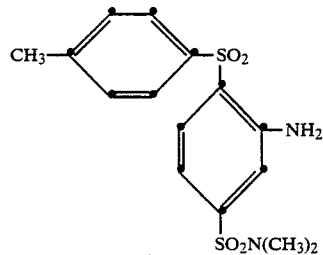 | 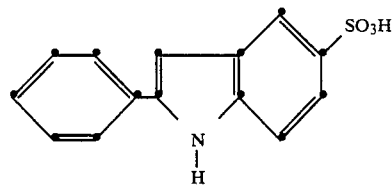 | orange |
| 111 | 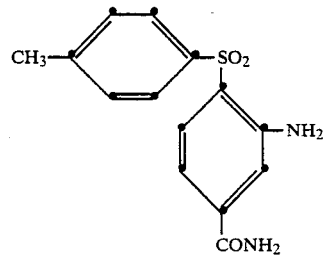 | " | " |
| 112 | 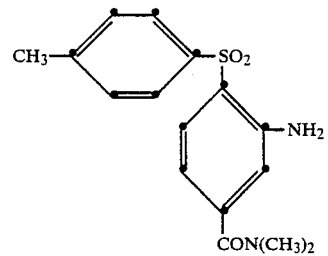 | 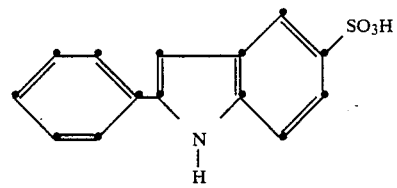 | orange |
| 113 | 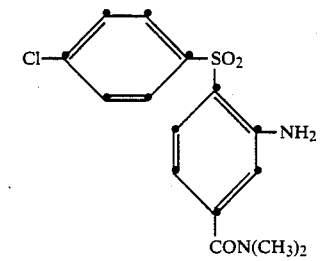 | " | " |

| | | |
|---|---|---|
| 114 | 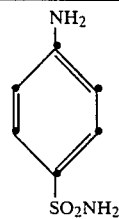 | 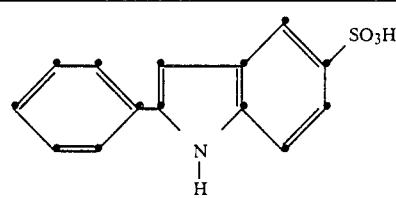 yellowish orange |
| 115 | 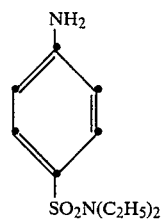 | 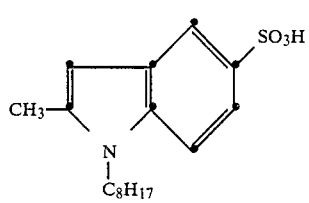 orange |
| 116 | 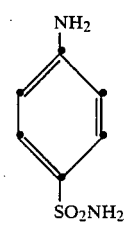 | 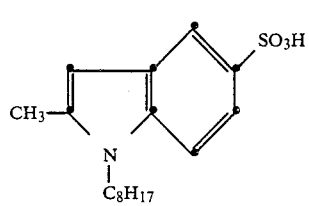 yellow |
| 117 | 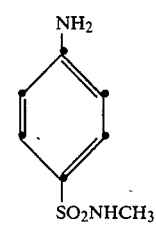 | " " |
| 118 | 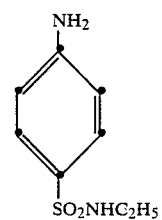 | 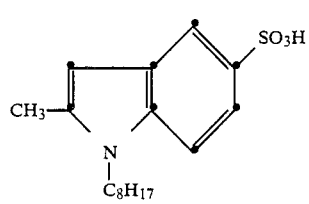 yellow |
| 119 | 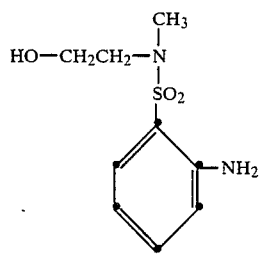 | " " |
| 120 | 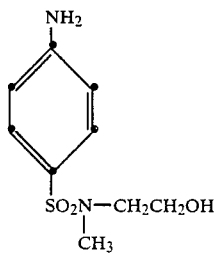 | 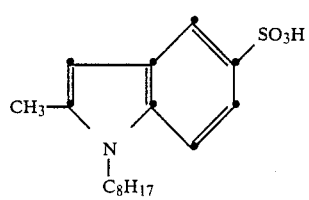 yellow |
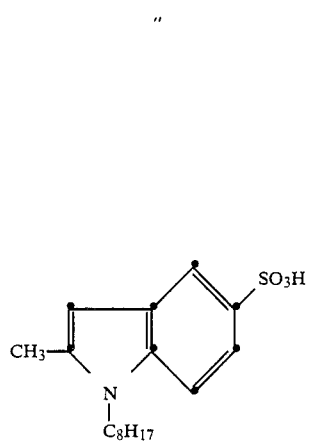
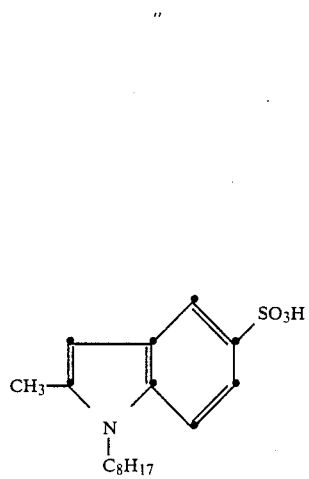

| | | | |
|---|---|---|---|
| 121 | 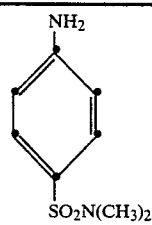 | " | " |
| 122 | 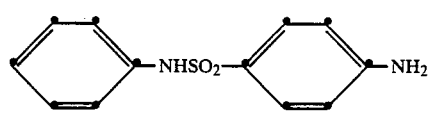 | 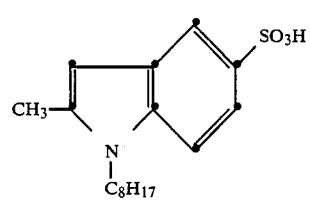 | yellow |
| 123 | " | 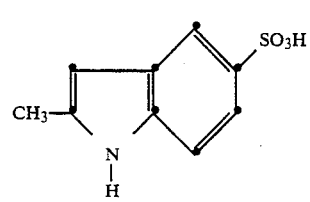 | " |
| 124 | 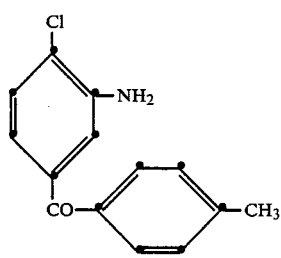 | 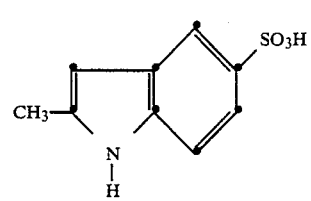 | yellow |
| 125 | 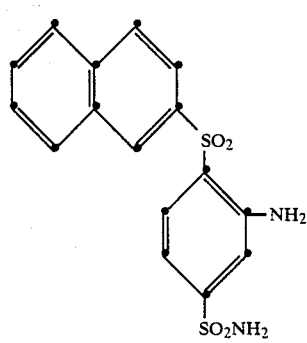 | 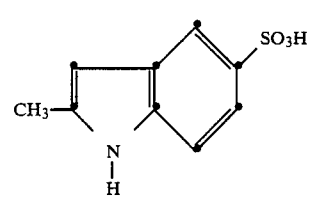 | reddish yellow |
| 126 | 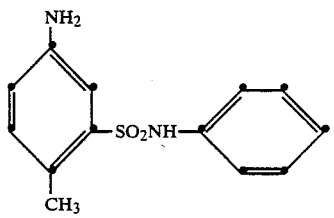 | 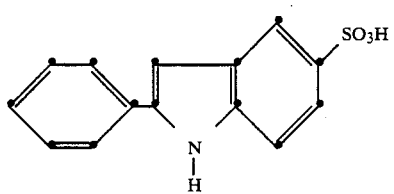 | reddish yellow |
| 127 | 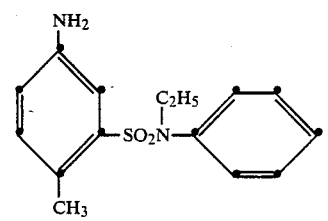 | " | " |

-continued
| 128 | 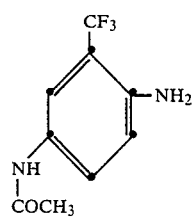 | 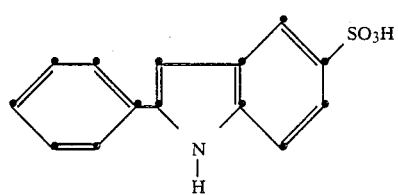 | reddish yellow |
| 129 | 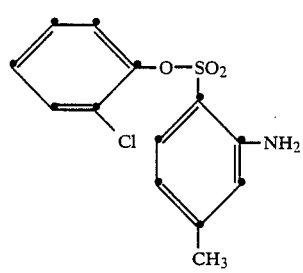 | " | yellowish orange |
| 130 | 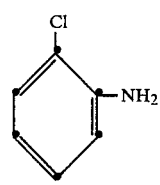 | 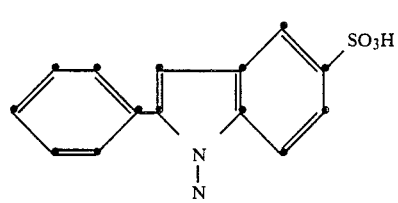 | reddish yellow |
| 131 | 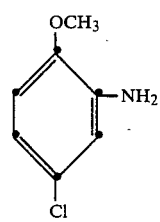 | " | yellowish orange |
| 132 | 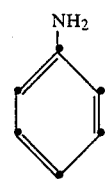 | 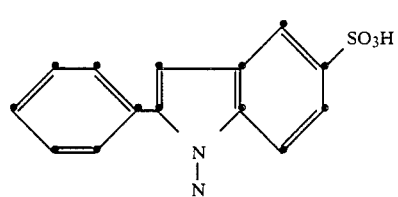 | yellow |
| 133 | 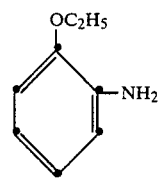 | " | yellowish orange |
| 134 | 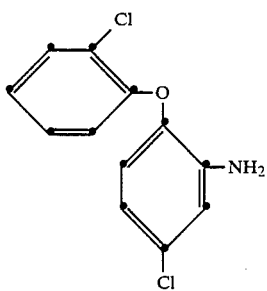 | 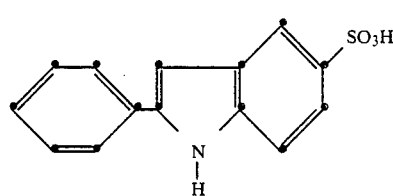 | yellowish orange |

| | | | |
|---|---|---|---|
| 135 | 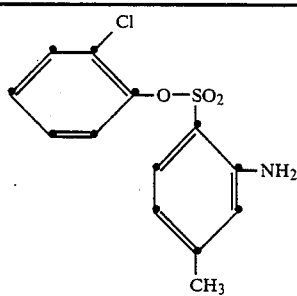 | 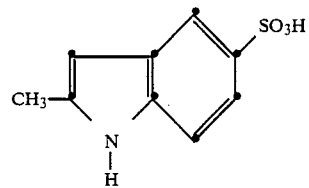 | yellow |
| 136 | 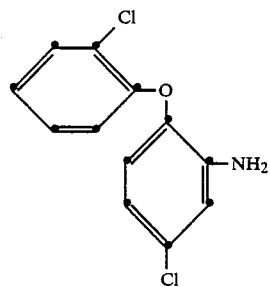 | 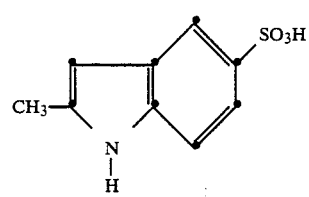 | reddish yellow |
| 137 | 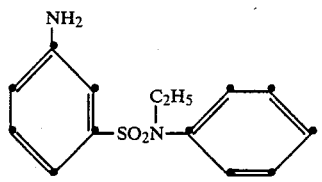 | 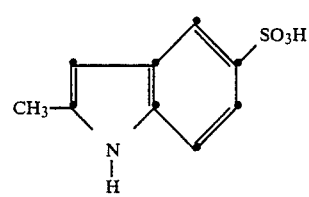 | yellow |
| 138 | 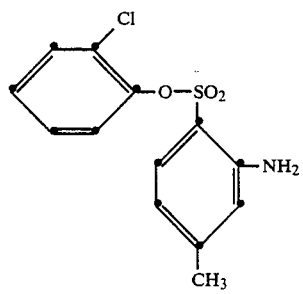 | 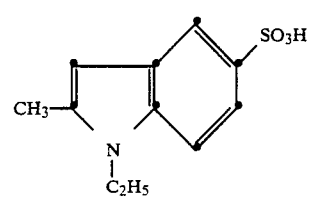 | reddish yellow |
| 139 | 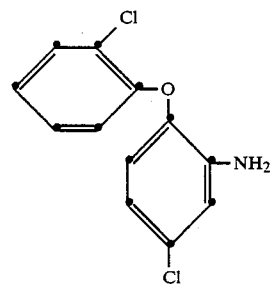 | 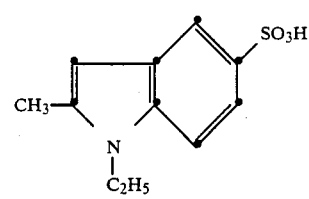 | reddish yellow |
| 140 | 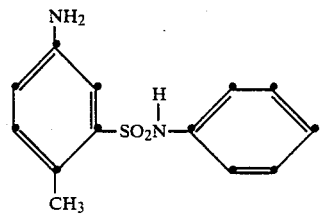 | " | yellow |

| 141 | 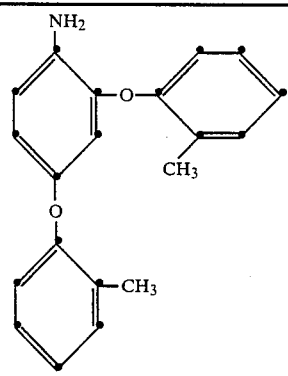 | 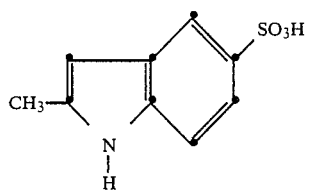 | reddish yellow |
| 142 | 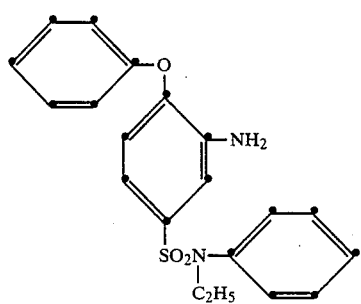 | 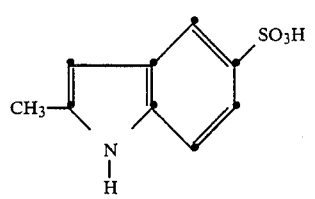 | reddish yellow |
| 143 | 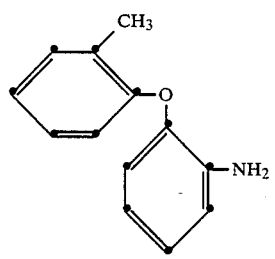 | 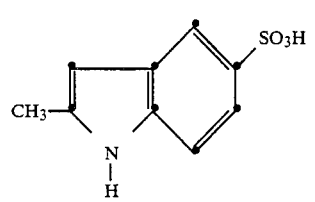 | reddish yellow |
| 144 | 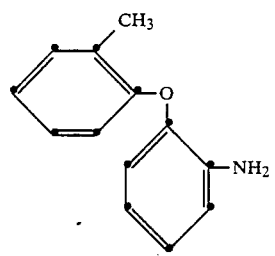 | 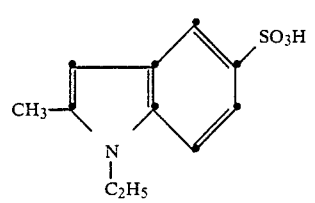 | reddish yellow |
| 145 | 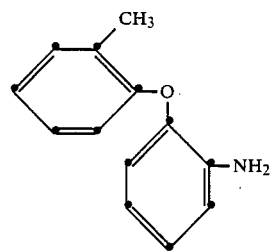 | 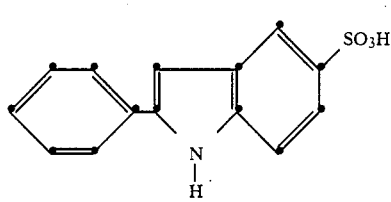 | yellowish orange |
| 146 | 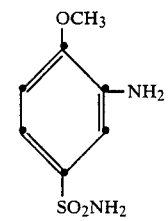 | ″ | ″ |

-continued
| | | | |
|---|---|---|---|
| 147 | 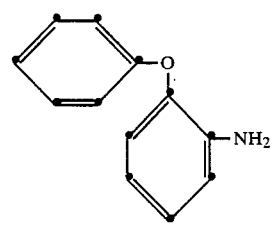 | 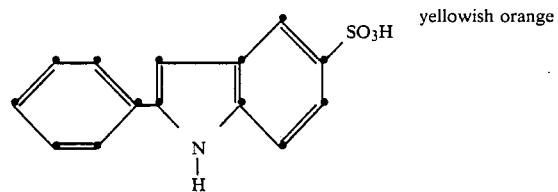 | yellowish orange |
| 148 | 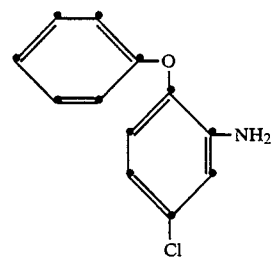 | " | " |
| 149 | 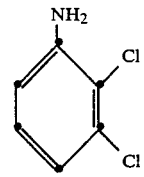 | 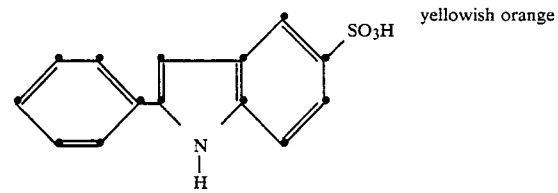 | yellowish orange |
| 150 | 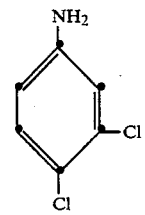 | " | " |
| 151 | 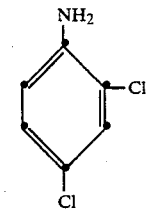 | 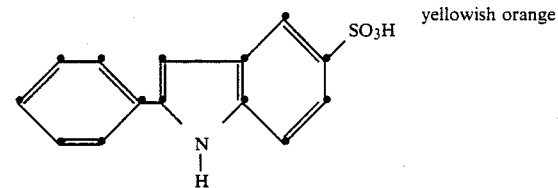 | yellowish orange |
| 152 | 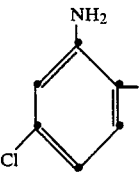 | " | " |
| 153 | 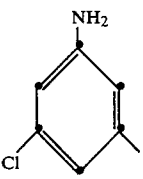 | 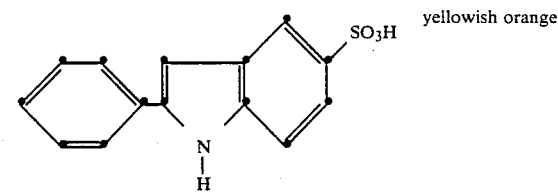 | yellowish orange |

-continued
| 154 | 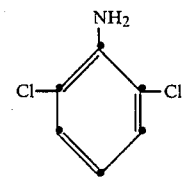 | " | " |
| 155 | 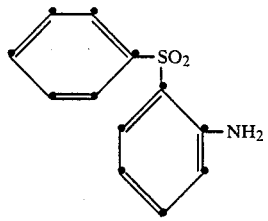 | 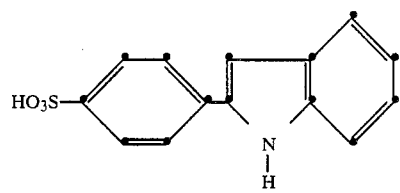 | yellowish orange |
| 156 | 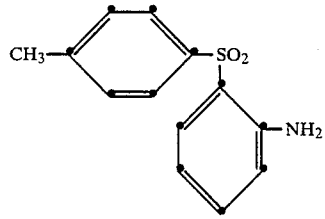 | " | " |
| 157 | 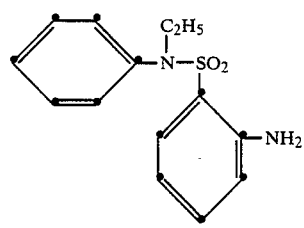 | 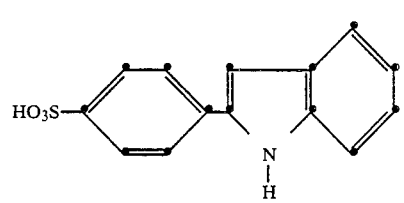 | yellowish orange |
| 158 | 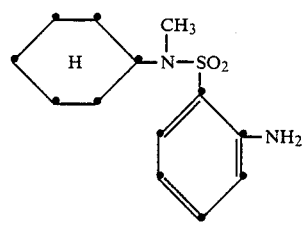 | " | " |
| 159 | 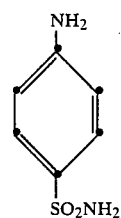 | 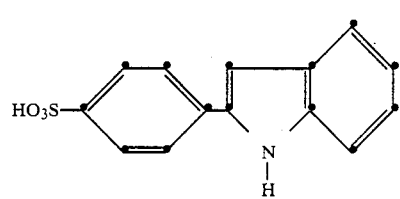 | yellowish orange |
| 160 | 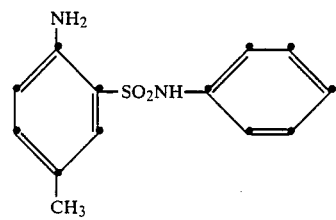 | " | reddish yellow |

| | | | |
|---|---|---|---|
| 161 | 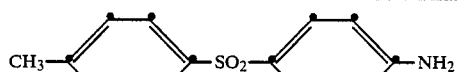 | 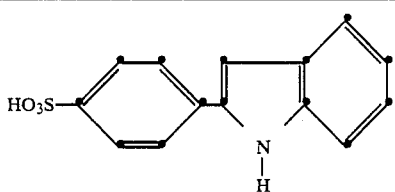 | yellowish orange |
| 162 | 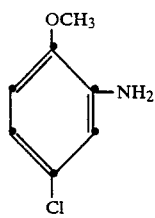 | " | " |
| 163 | 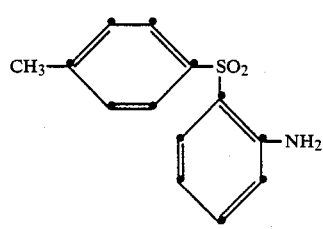 | 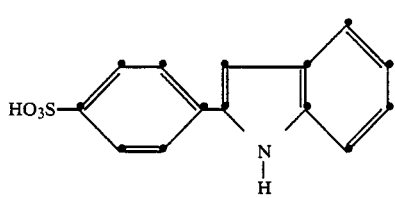 | yellowish orange |
| 164 | 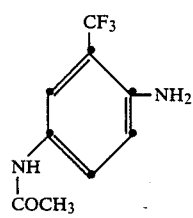 | " | " |
| 165 | 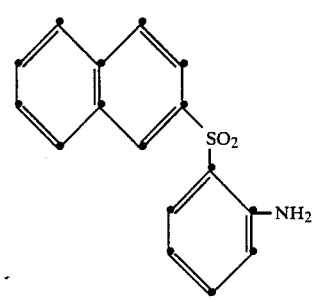 | 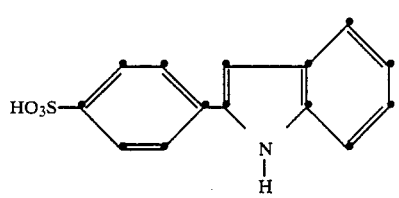 | yellowish orange |
| 166 | 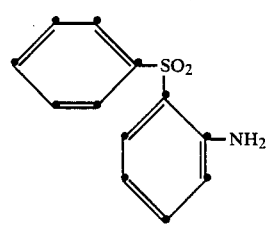 | 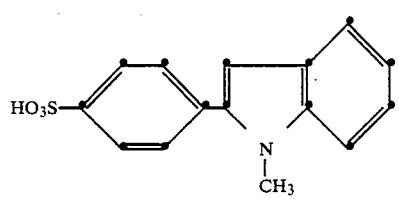 | yellowish orange |
| 167 | 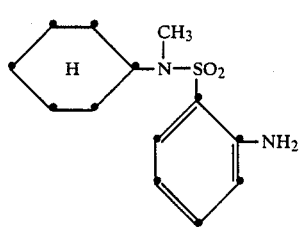 | " | " |

| | | | |
|---|---|---|---|
| 168 | 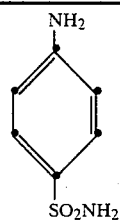 | 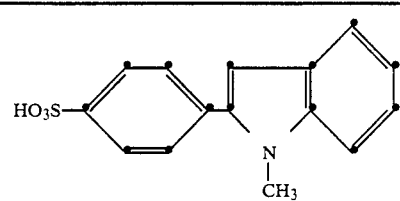 | yellowish orange |
| 169 | 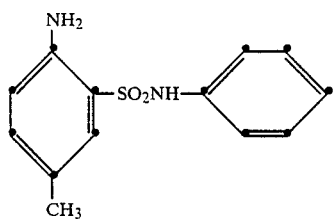 | " | reddish yellow |
| 170 | 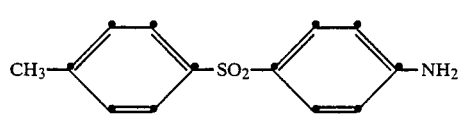 | 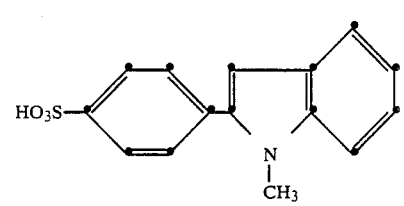 | yellowish orange |
| 171 | 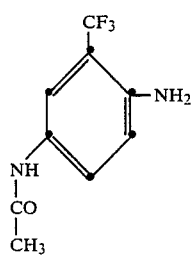 | " | reddish yellow |
| 172 | 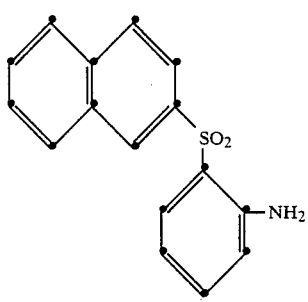 | 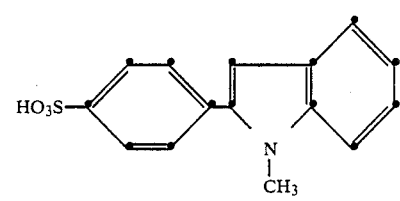 | yellowish orange |
| 173 | 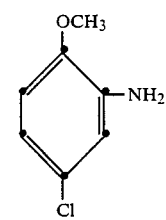 | " | " |
| 174 | 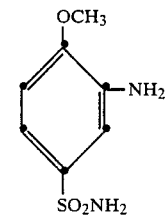 | 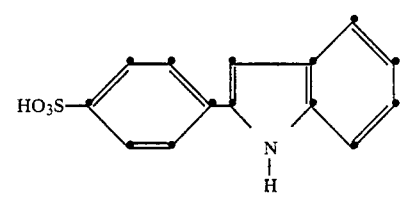 | yellowish orange |

-continued
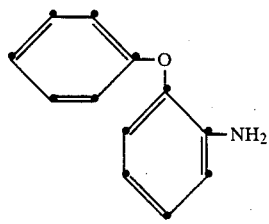
176 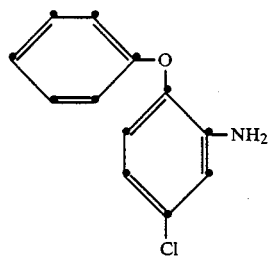 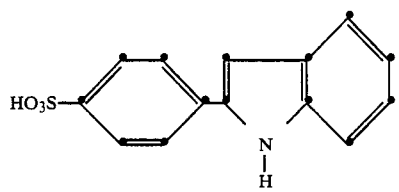 yellowish orange
177 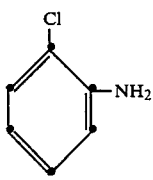 " reddish yellow
178 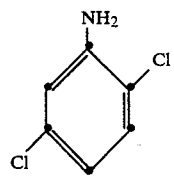 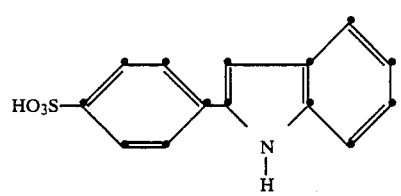 yellowish orange
179 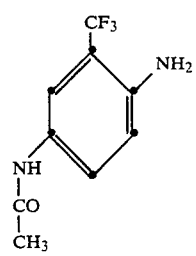 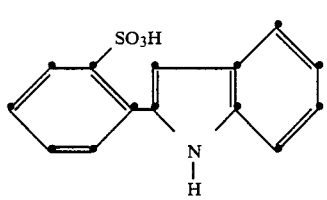 reddish yellow
180 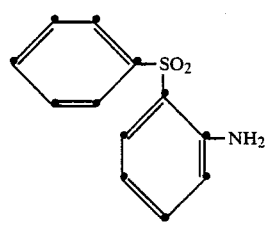 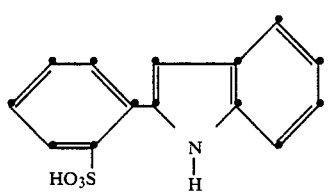 yellowish orange
181 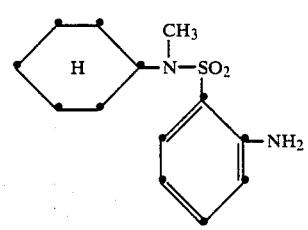 " "

| | | |
|---|---|---|
| 182 | 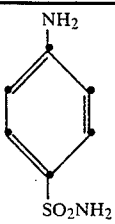 | 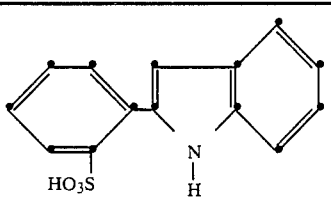 yellowish orange |
| 183 | 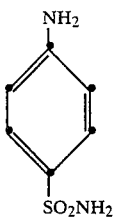 | 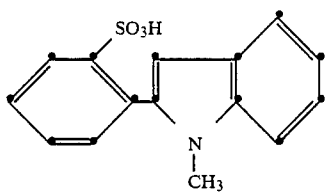 " |
| 184 | 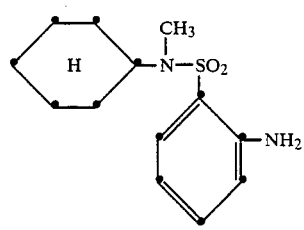 | 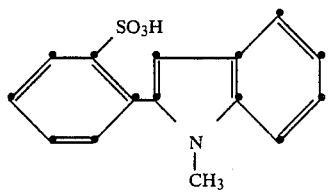 yellowish orange |
| 185 | 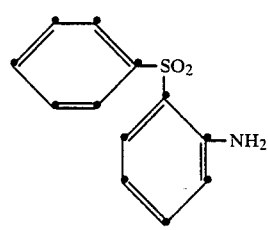 | " " |
| 186 | 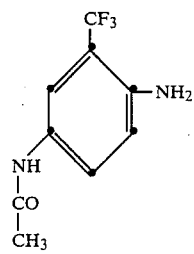 | 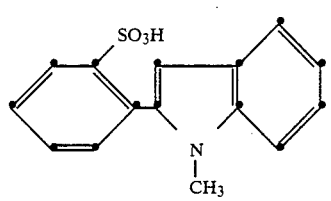 reddish yellow |

DYEING PROCEDURE I 10 parts of Helanca ® tricot are dyed in 500 parts of an aqueous liquor which contains 2 g/l of ammonium acetate and is adjusted with acetic acid to pH 5. The concentration of dye of Example 1 is 0.7%, based on the weight of the fabric. The dyeing time at 98° C. is 30 to 90 minutes. The dyed tricot fabric is then removed from the bath and washed and dried in the conventional manner.

The tricot fabric is dyed in a pure yellowish orange shade of good general fastness properties.

DYEING PROCEDURE II 10 parts of Helanca ® tricot are dyed in 500 parts of an aqueous liquor which contains 1 g/l of monosodium phosphate and is adjusted with disodium phosphate to pH 6. The concentration of dye of Example 74 is 1%, based on the weight of the fabric. The dyeing time at 98° C. is 30 to 90 minutes. The dyed tricot fabric is then removed from the bath and washed and dried in the conventional manner. The tricot is dyed in a pure yellowish orange shade of good general fastness properties.

DYEING PROCEDURE III 10 parts of woolen piece goods are dyed in an aqueous liquor containing 0.8% of the dye of Example 1, 5% of calcined Glauber's salt and 4% of 96% sulfuric acid, in each case based on the weight of the fabric. The dyeing time at 98° C. is 30 to 60 minutes. The dyed wool is washed and dried in the conventional manner and has very good general fastness properties.

DYEING PROCEDURE IV 10 parts of a wool/polyamide blend (50:50) are dyed in an aqueous liquor which contains 0.8% of the dye of Example 1, 5% of calcined Glauber's salt, 1% of a levelling agent, 2% of 80% acetic acid and 2% of a retarding and levelling auxiliary, in each case based on the weight of the fabric. The dyeing time is 30 to 60 minutes at 98° C. The fabric, which is washed and dried in the conventional manner, is dyed tone-in-tone.

DYEING PROCEDURE V 10 parts of Helanca ® tricot fabric are dyed in 500 parts of an aqueous liquor which contains 2 g/l of ammonium acetate and is adjusted with acetic acid to pH 5. The dye liquor contains 0.75 g of the yellow dye of the formula

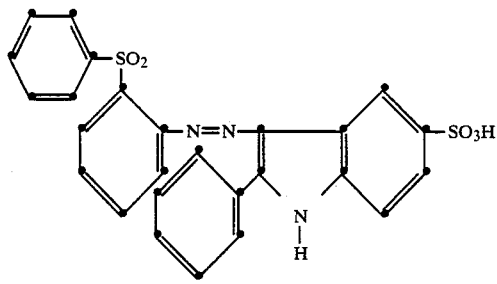

0.8% of the red dye of the formula

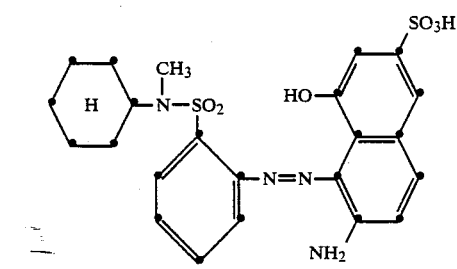

and 0.49% of the blue dye of the formula

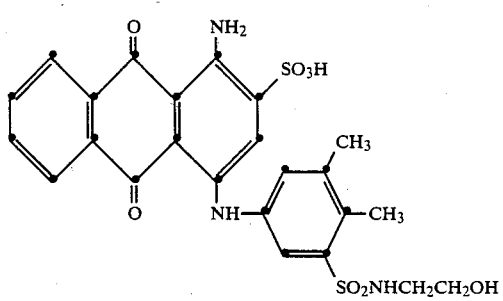

the amounts being based in each case on the weight of the fabric. The dyeing time is 30 to 60 minutes at 98° C. The dyed tricot fabric is washed and dried in the conventional manner. A completely level reddish brown dyeing with no trace of material-induced barriness is obtained.

DYEING PROCEDURE VI 500 m² of a polyamide 66 cut-pile carpet (brushed goods backed with polypropylene tape fabric) having a weight of 535 g/m² are continuously prewetted in a liquor which contains 1 g/liter of the polyadduct of 1 mole of nonylphenol and 9 moles of ethylene oxide, and then expressed to a pick-up of 40% by weight.

A dye foam having a blow ratio of 1:10 is prepared in a mixer from an aqueous liquor of the following composition: 0.45 g/l of the red dye of the formula

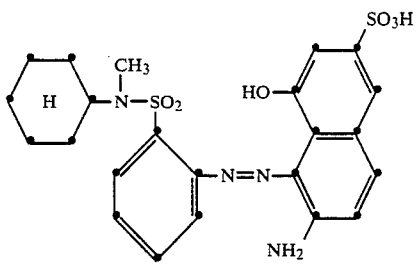

0.9 g/l of the yellow dye of the formula

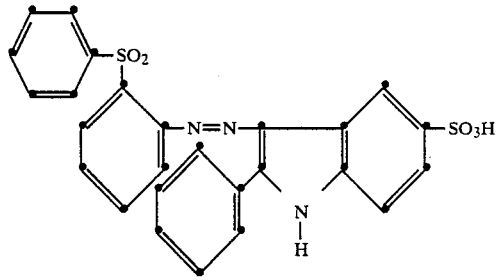

0.3 g/l of the blue dye mixture which contains the dyes of the formulae

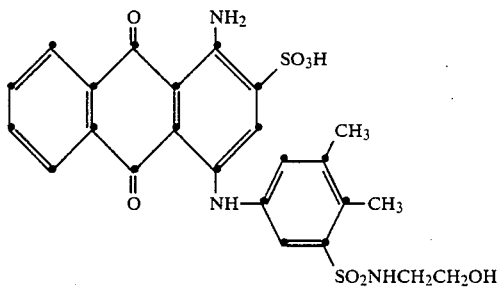

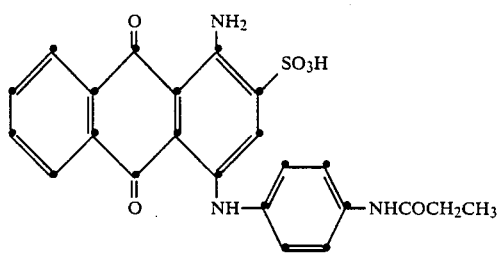

in the ratio 1:1, 2.5 g/l of a foam stabiliser mixture consisting of coconut fatty acid diethanolamide/nonylphenol polyglycol(11) ether and sodium lauryl triglycol ether sulfate, 0.6 g/l of the oxyalkylene-siloxane copolymer of the formula

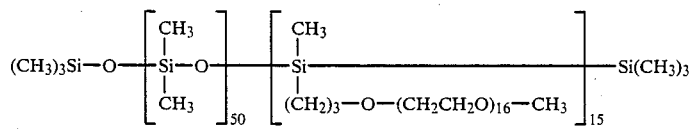

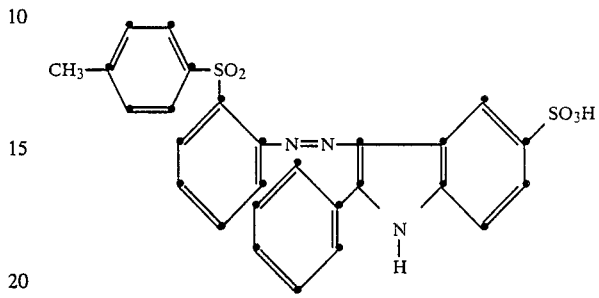

1 g/l of sodium acetate, and acetic acid for adjusting the pH value of the liquor to 6.

This foam is then applied from a container, equipped with a knife for adjusting the desired thickness of the foam, via an applicator roll using a carriage to the pile side of the carpet which passes through the dyeing unit at a rate of 9 m/minute. The height of the foam is 8 mm. The foam add-on is 135%.

A vaccum (~0.1 bar) is then applied to the back of the carpet in order to effect partial penetration of the layer of foam into the carpet, whereby the height of the foam is somewhat reduced. The carpet then passes over a conveyor roll into a steamer (102° C., saturated steam), where the foam rises slightly and is then collapsed. The carpet is subsequently sprayed with water of 80° C., then centrifuged, and dried at 100° C.-130° C. in a cylindrical sieve drier.

The carpet fabric is dyed in a level beige shape with excellent penetration of the dye. The foam dyeing has a positive influence on the softness and bulk of the fabric.

DYEING PROCEDURE VII (CARPET PRINTING)

A polyamide 6 cut-pile fitted carpet having a weight of 350 to 400 g/m² is impregnated on a padder with a padding liquor consisting of 988 parts of water, 10 parts of 36° Bé sodium hydroxide solution and 2 parts of wetting agent, and squeezed out to a pick-up of 80%.

A dye paste of the following composition is sprayed in the form of a pattern, by means of a nozzle, onto the pretreated carpet:
942 parts of water,
50 parts of a thickener,
3 parts of an antifoam,
5 parts of the red dye of the formula

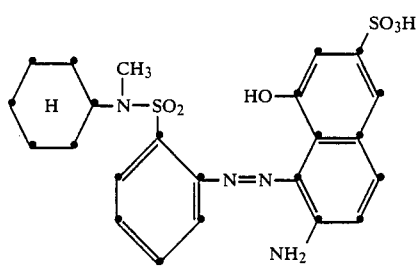

1.5 parts of the yellow dye of the formula 1 part of the blue dye mixture which contains the dyes of the formulae

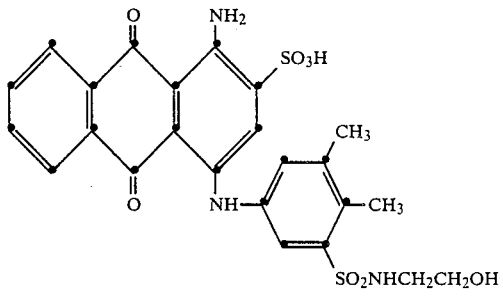

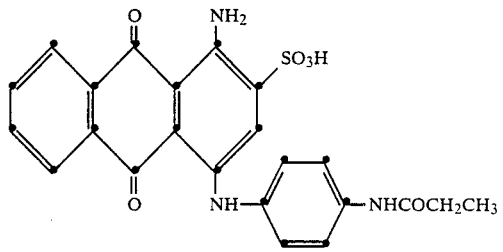

in the rato 1:1.

The thickener used has the following composition: 240 parts of white spirit, 50 parts of a water-in-oil emulsifier, 20 parts of an oil-in-water emulsifier, 20 parts of an antifoam, 50 parts of a crosslinked carboxyvinyl polymer having a molecular weight of approx. 4.000.000, 70 parts of a linear carboxyvinyl polymer having a molecular weight of approx. 1.000.000 and 550 parts of water, the pH having been adjusted to a value of 4.5 with acetic acid.

The material which has been sprayed with the dye paste is then treated with saturated steam at 101° C. for 5 minutes in order to fix the dyes, then rinsed, neutralised, rinsed again and dried.

A claret shade pattern with very sharp contours is obtained on the cut-pile fitted carpet. Dye penetration is very good and there is absolutely no frosting.

DYEING PROCEDURE VIII (CONTINUOUS CARPET DYEING)

2.7 parts of the yellow dye of the formula

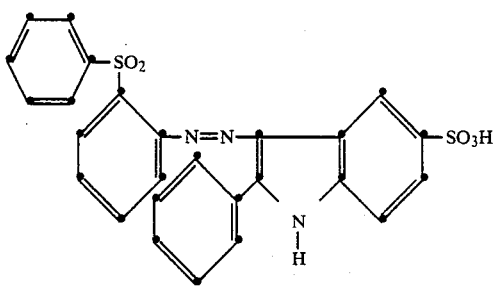

1.2 parts of the red dye of the formula

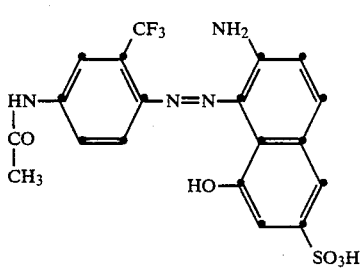

and 1.3 parts of the blue dye of the formula

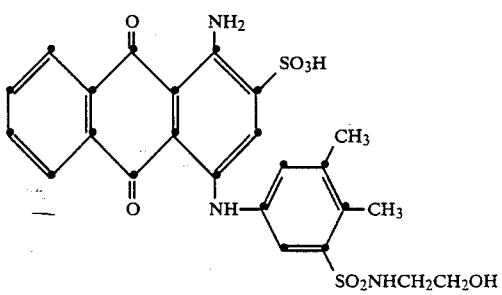

are dissolved in 100 parts of water by brief boiling. This solution is then added to a solution containing 3 parts of a thickener based on locust beam gum, 5.0 parts of a coacervate-forming padding assistant based on a condensation product of a higher-molecular fatty acid with an oxyalkylamine, 2.0 parts of crystalline monosodium phosphate and 1.0 part of crystalline disodium phosphate in 500 parts of cold water. The mixture is then bulked to 1000 parts with cold water. 300% (based on the weight of carpet) of this liquor, which has a pH value of 5.5 to 6.5, are then applied to a polyamide tufted undyed carpet, at a carpet speed of 8 meters per minute. The impregnated carpet is passed into a festoon steamer, where it is treated for 10 minutes with saturated steam at 98° to 100° C. The carpet is then washed in an open width washing machine. It is dyed in a neutral brown shade.

What is claimed is:

1. A monoazo dye of the formula

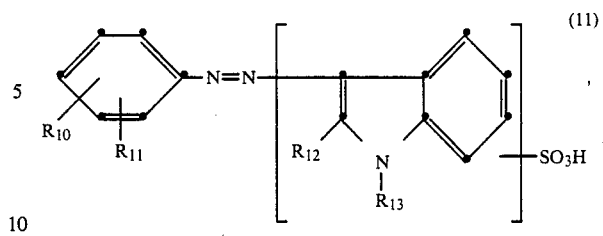

wherein $R_{10}$ is hydrogen and $R_{11}$ is phenoxy or naphthoxy each unsubstituted or substituted by $C_{1-4}$-alkyl, $C_{1-4}$-alkoxy, halogen, $C_{1-6}$-alkanoylamino or hydroxyl, or

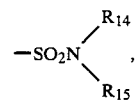

and $R_{14}$ and $R_{15}$ are each independently $C_{1-4}$-alkyl, $C_{1-4}$-hydroxyalkyl or $C_{5-7}$-cycloalkyl; or $R_{10}$ is $C_{1-4}$-alkyl and $R_{11}$ is phenoxy or naphthoxy each unsubstituted or substituted by $C_{1-4}$-alkyl, $C_{1-4}$-alkoxy, halogen, $C_{1-6}$-alkanoylamino or hydroxyl; or $R_{10}$ is $C_{1-4}$-alkoxy and $R_{11}$ is hydrogen, halogen, $C_{1-12}$-alkyl, phenoxy, naphthoxy, phenoxysulfonyl, naphthoxysulfonyl each unsaturated or substituted by $C_{1-4}$-alkyl, $C_{1-4}$-alkoxy, halogen, $C_{1-6}$-alkanoylamino or hydroxyl, or

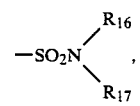

and $R_{16}$ and $R_{17}$ are each independently $C_{1-12}$-alkyl unsubstituted or substituted by halogen, hydroxyl, cyano, $C_{1-4}$-alkoxy, $C_{1-6}$-alkanoyl or benzoyl, cycloalkyl containing 5- to 7-membered ring unsubstituted or substituted by $C_{1-4}$-alkyl; or $R_{10}$ is halogen and $R_{11}$ is phenoxy or naphthoxy each unsubstituted or substituted by $C_{1-4}$-alkyl, $C_{1-4}$-alkoxy, halogen, $C_{1-6}$-alkanoylamino or hydroxyl; or $R_{10}$ is $C_{2-4}$-alkanoylamino and $R_{11}$ is hydrogen, halogen, $C_{1-12}$-alkyl, phenoxy, naphthoxy, phenoxysulfonyl or naphthoxysulfonyl each unsubstituted or substituted by $C_{1-4}$-alkyl, $C_{1-4}$-alkoxy, halogen, $C_{1-6}$-alkanoylamino or hydroxyl, or

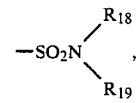

and $R_{18}$ and $R_{19}$ are each independently $C_{1-12}$-alkyl unsubstituted or substituted by halogen, hydroxyl, cyano, $C_{1-4}$-alkoxy, $C_{1-6}$-alkanoyl or benzoyl, cycloalkyl containing 5- to 7-membered ring unsubstituted or substituted by $C_{1-4}$-alkyl; or phenyl or naphthyl each unsubstituted or substituted by $C_{1-4}$-alkyl, $C_{1-4}$-alkoxy, halogen, trifluoromethyl, $C_{1-6}$-alkanoylamino, hydroxyl or carbonyl; $R_{12}$ is $C_{1-12}$-alkyl unsubstituted or substituted by halogen, hydroxyl, cyano, $C_{1-4}$-alkoxy, $C_{1-6}$-alkanoyl or benzoyl or phenyl or naphthyl each unsubstituted or substituted by $C_{1-4}$-alkyl, $C_{1-4}$-alkoxy, halogen, trifluoromethyl, $C_{1-6}$-alkanoylamino, hydroxyl, carboxyl or sulfo; and $R_{13}$ is hydrogen or $C_{1-12}$-alkyl.

2. A monoazo dye according to claim 1, wherein $R_{10}$ is hydrogen and $R_{11}$ is

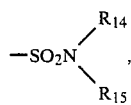

$R_{14}$ and $R_{15}$ are each independently $C_{1-4}$ alkyl, $C_{1-4}$-hydroxyalkyl or $C_{5-7}$-cycloalkyl, or $R_{10}$ is $C_{1-4}$-alkoxy and $R_{11}$ is hydrogen or halogen, or $R_{10}$ is halogen and $R_{11}$ is phenoxy or naphthoxy each unsubstituted or substituted by $C_{1-4}$-alkyl, $C_{1-4}$-alkoxy, halogen, $C_{1-6}$-alkanoylamino or hydroxyl; or $R_{10}$ is $C_{2-4}$-alkanoylamino and $R_{11}$ is hydrogen, halogen, or

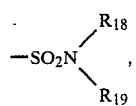

and $R_{18}$ and $R_{19}$ are each independently $C_{1-12}$-alkyl unsubstituted or substituted by halogen, hydroxyl, cyano, $C_{1-4}$-alkoxy, $C_{1-16}$-alkanoyl or benzoyl, cycloalkyl containing 5- to 7-membered ring unsubstituted or substituted by $C_{1-4}$-alkyl; or phenyl or naphthyl each unsubstituted or substituted by $C_{1-4}$-alkyl, $C_{1-4}$-alkoxy, halogen, trifluoromethyl, $C_{1-6}$-alkanoylamino, hydroxyl or carbonyl; $R_{12}$ is $C_{1-12}$-alkyl unsubstituted or substituted by halogen, hydroxyl, cyano, $C_{1-4}$-alkoxy, $C_{1-6}$-alkanoyl or benzoyl or phenyl or naphthyl each unsubstituted or substituted by $C_{1-4}$-alkyl $C_{1-4}$-alkoxy, halogen, trifluoromethyl, $C_{1-6}$-alkanoylamino, hydroxyl, carboxyl or sulfo; and $R_{13}$ is hydrogen or $C_{1-12}$-alkyl.

3. A monoazo dye according to claim 2, wherein $R_{10}$ is $C_{1-4}$-alkoxy and $R_{11}$ is hydrogen or halogen.

4. A monoazo dye according to claim 2, wherein $R_{10}$ is halogen and $R_{11}$ is phenyloxy or phenyloxy which is substituted by $C_{1-4}$-alkyl or halogen.

5. A monoazo dye according to claim 2, wherein $R_{10}$ is $C_{2-4}$-alknoylamino and $R_{11}$ is hydrogen, halogen or a radical of the formula

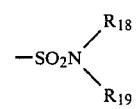

and $R_{18}$ and $R_{19}$ are each independently $C_{1-4}$-alkyl, $C_{1-4}$-hydroxyalkyl, $C_{5-7}$-cycloalkyl, phenyl or phenyl substituted by halogen, trifluoromethyl or $C_{1-4}$-alkyl.

6. A monoazo dye according to claim 2, wherein $R_{12}$ is $C_{1-4}$-alkyl or phenyl and $R_{13}$ is hydrogen or $C_{1-8}$-alkyl.

7. A monoazo dye according to claim 2, of the formula

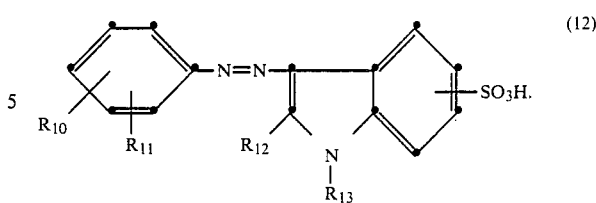

8. A monoazo dye according to claim 2, of the formula

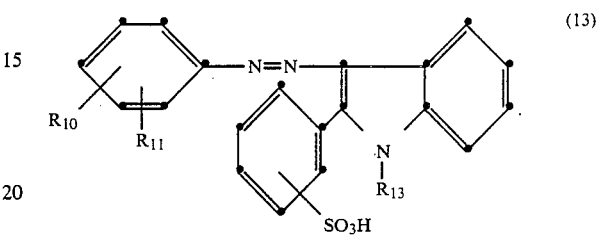

9. A monoazo dye of the formula

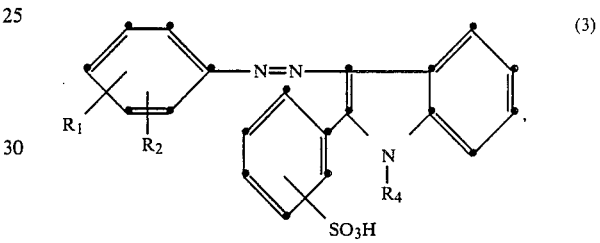

wherein $R_1$ is phenylsulfonyl, naphthylsulfonyl, p-methylphenylsulfonyl or p-chlorophenylsulfonyl, $R_2$ is hydrogen, chlorine, trifluoromethyl, $-SO_2NH_2$, N-methyl-N-cyclohexylaminosulfonyl, phenylaminosulfonyl or N-ethyl-N-phenylaminosulfonyl, and $R_4$ is hydrogen or methyl.

10. A monoazo dye of the formula

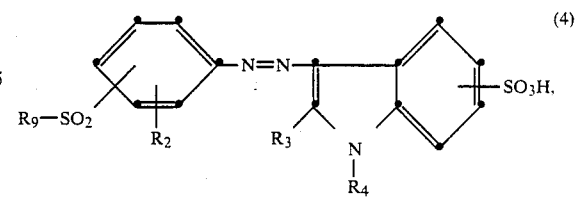

wherein $R_2$ is hydrogen, $R_3$ is phenyl, $R_4$ is hydrogen and $R_9$ is phenyl.

11. The monoazo dye according to claim 10, of the formula

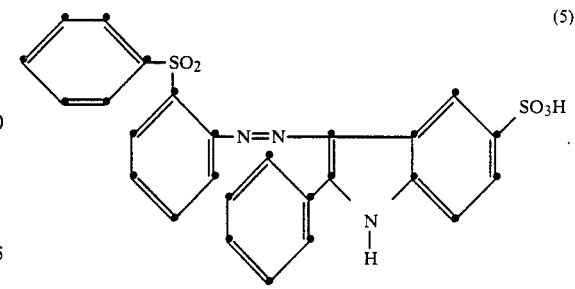

* * * * *